(12) United States Patent
Yenni et al.

(10) Patent No.: US 10,663,959 B2
(45) Date of Patent: *May 26, 2020

(54) SMART HVAC MANIFOLD SYSTEM

(71) Applicant: NORTH PARK INNOVATIONS GROUP, INC, Ellicottville, NY (US)

(72) Inventors: Edward Yenni, Bay Village, OH (US); Timothy Vielhaber, Avon, OH (US); David Rodgers, North Ridgeville, OH (US); John Podhradsky, North Olmsted, OH (US); James L. Bergmann, Akron, OH (US); William P. Spohn, Gibsonia, PA (US); William Northrup, Ellicottville, NY (US); Robert James Bonitati, Cleveland, OH (US)

(73) Assignee: STRIDE TOOL, INC., Glenwillow, OH (US)

( * ) Notice: Subject to any disclaimer, the term of this patent is extended or adjusted under 35 U.S.C. 154(b) by 323 days.

This patent is subject to a terminal disclaimer.

(21) Appl. No.: 15/673,768

(22) Filed: Aug. 10, 2017

(65) Prior Publication Data

US 2017/0350616 A1    Dec. 7, 2017

Related U.S. Application Data

(62) Division of application No. 14/160,006, filed on Jan. 21, 2014, now Pat. No. 10,452,061.
(Continued)

(51) Int. Cl.
*G05B 23/02*  (2006.01)
*G05B 15/02*  (2006.01)
(Continued)

(52) U.S. Cl.
CPC .......... *G05B 23/0272* (2013.01); *F24F 11/30* (2018.01); *F24F 11/89* (2018.01);
(Continued)

(58) Field of Classification Search
None
See application file for complete search history.

(56) References Cited

U.S. PATENT DOCUMENTS 6,128,910 A    10/2000  Faircloth
7,079,967 B2    7/2006  Rossi
(Continued)

FOREIGN PATENT DOCUMENTS

WO    2011149600    12/2011

OTHER PUBLICATIONS

Australian Examination Report dated Jun. 8, 2016 for corresponding Australian application No. 2014238453.
(Continued)

*Primary Examiner* — Roy Y Yi
(74) *Attorney, Agent, or Firm* — Tarolli, Sundheim, Covell & Tummino LLP

(57) ABSTRACT

The smart HVAC manifold system for servicing air conditioning systems is designed to dynamically manage the data acquisition process and to measure and calculate the performance indicators and output as the load conditions and or equipment operation change taking into account variables in the installation that can impact performance. Both visually and by a very specific data set the performance of the equipment and the installation can quickly be assessed and specific problems identified along with suggestions of typical faults or problems that may need addressed by the technician.

The smart HVAC manifold system provides a means of quickly and electronically handling the manual data acqui-
(Continued)

sition process which would include component and or system model and serial numbers, equipment location (GPS tagging), customer name, environmental conditions that effect performance and performance measurement (weather data and elevation), and supports photo, voice and text documentation. These features streamline data acquisition, allow remote support, and minimizing transcription errors and preventing data-gaming when servicing equipment, commissioning or retro commissioning the system.

16 Claims, 13 Drawing Sheets

Related U.S. Application Data

(60) Provisional application No. 61/793,660, filed on Mar. 15, 2013.

(51) Int. Cl.
*F24F 11/89* (2018.01)
*F24F 11/30* (2018.01)
*F24F 11/56* (2018.01)
*F24F 11/58* (2018.01)
*F24F 11/52* (2018.01)

(52) U.S. Cl.
CPC ......... *G05B 15/02* (2013.01); *G05B 23/0216* (2013.01); *F24F 11/52* (2018.01); *F24F 11/56* (2018.01); *F24F 11/58* (2018.01); *G05B 2219/25062* (2013.01); *G05B 2219/2614* (2013.01); *G05B 2219/2642* (2013.01)

(56) References Cited

U.S. PATENT DOCUMENTS

| | | |
|---|---|---|
| 2008/0196425 A1 | 8/2008 | Temple |
| 2010/0289643 A1 | 11/2010 | Trundle |
| 2011/0202185 A1 | 8/2011 | Imes et al. |
| 2012/0053740 A1 | 3/2012 | Venkatakrishnan et al. |
| 2012/0221718 A1* | 8/2012 | Imes ................. F24F 11/63 709/224 |
| 2014/0081465 A1 | 3/2014 | Wang |
| 2014/0262130 A1* | 9/2014 | Yenni ............ G05B 23/0216 165/11.1 |

OTHER PUBLICATIONS

Canadian Office Action dated Sep. 20, 2016 for corresponding Canadian application No. 2,906,287.
Extended European Search Report dated Oct. 28, 2016 for corresponding European No. 14767983.1.

* cited by examiner

Intelligent Manifold System
Entry Level System

Measurement Platform
- Pressures
- Saturation temperatures
- Measured temperatures
- Superheat and subcooling

Data Evaluation
- System stability indication
- Measurement conditioning
- Calibration (Title 24)
- Custom Templates

Communications
- Customer data management
- Equipment data management
- Email/Print Reports
- Photo documentation
- Trending measurements
- GPS tagging
- Access to Imperial community

FIG. 7

Intelligent Manifold System
Basic Capacity Testing System

Measurement Platform
- Pressures
- Saturation temperatures
- Measured temperatures
- Superheat and subcooling

Data Evaluation
- System stability indication
- Measurement conditioning
- Calibration (Title 24)
- Custom Templates
- +Basic charging target superheat fixed orifice (requires smart device)
- +Real time BTUh calculation (appliance output)
- +Basic trouble shooting module

Communications
- Customer data management
- Equipment data management
- Email/Print Reports
- Photo documentation
- Trending measurements
- GPS tagging
- Access to Imperial community

FIG. 9

Intelligent Manifold System
Capacity and Efficiency (Field EER)

Measurement Platform
- Pressures
- Saturation temperatures
- Measured temperatures
- Superheat and subcooling Data Evaluation
- System stability indication
- Measurement conditioning
- Calibration (Title 24)
- Custom Templates
- Basic charging target superheat fixed orifice (requires smart device)
- +Real time BTUh calculation (appliance output)
- +Field EER (Energy Efficiency Ratio)
- +Equipment Profiles (Air Conditioning and Heat Pump Only)
- +Basic trouble shooting module
- +Perfect Charge Module Communications
- Customer data management
- Equipment data management
- Email/Print Reports
- Photo documentation
- Trending measurements
- GPS tagging
- Access to Imperial community

FIG. 11

Intelligent Manifold System
Advanced Troubleshooting Commissioning Kit
For Refrigeration & Commercial A/C Measurement Platform
- Pressures
- Saturation temperatures
- Measured temperatures
- Superheat and subcooling Data Evaluation
- System stability indication
- Measurement conditioning
- Calibration (Title 24)
- Custom Templates
- Basic charging target superheat fixed orifice (requires smart device)
- +Real time BTUh calculation (appliance output)
- +Field EER (Energy Efficiency Ratio)
- +Equipment Profiles (Air Conditioning and Heat Pump Only)
- +Advanced shooting module
- +Perfect Charge Module Communications
- Customer data management
- Equipment data management
- Email/Print Reports
- Photo documentation
- Real time data acquisition
- GPS tagging
- Access to Imperial community
- +Remote monitoring/support

FIG. 13

SMART HVAC MANIFOLD SYSTEM

RELATED APPLICATION

This application is a divisional of U.S. application Ser. No. 14/160,006, filed on Jan. 21, 2014, which claims the benefit of U.S. Provisional Application Ser. No. 61/793,660, filed on Mar. 15, 2013, the disclosure of which is hereby incorporated by reference in its entirety.

FIELD OF THE INVENTION

The invention relates to heating, ventilation, air conditioning, and refrigeration (HVAC/R or, more commonly HVAC) systems. More specifically, the invention relates to a system that includes an apparatus and method for monitoring the operation of HVAC systems; acquiring, managing, sharing, and reporting data related to the HVAC systems; assessing the performance of HVAC systems; and installing, troubleshooting, and servicing the HVAC systems.

BACKGROUND OF THE INVENTION

HVAC systems are widely known. "Air conditioning" is a general term for a process that maintains comfort conditions in a defined area. Air conditioning includes sensible heating of the air (referred to generally as heating), sensible cooling and/or dehumidifying of the air (referred to generally as air conditioning, which can be abbreviated as A/C), humidifying the air, and cleaning or filtering the air. HVAC or air conditioning, as used herein, also includes refrigeration systems (e.g., coolers and freezers of consumer, commercial and industrial scale). Therefore, in this description, HVAC can encompass and describe any heating, ventilation, air conditioning, or refrigeration process or equipment. Also, an "A/C unit" can refer to conventional air conditioning unit, a refrigeration unit, or a heat pump.

All conventional A/C or refrigeration systems share the same basic components: a compressor, a condenser coil, a metering device, and an evaporator coil. Compressors compress the gaseous refrigerant and turn it into a subcooled liquid. Condenser coils to allow the refrigerant dissipate heat and become a sub cooled liquid. Metering devices control the flow of the sub cooled refrigerant into the evaporator coil. Evaporator coils expose the refrigerant to the system load turning the refrigerant into a superheated gas. Common metering devices are capillary tubes and in new systems Thermostatic Expansion Valves (TXVs).

The study of air and its properties is called psychrometrics. Typical psychrometric units of measure are dry bulb temperature, wet bulb temperature, relative humidity and enthalpy. HVAC technicians study psychrometrics to accurately predict the final properties of the conditioned air and also to determine if the conditioning equipment is performing the way it was engineered to operate. Air has mass and weight and can therefore store heat energy. The amount of heat that the air can store is dependent upon the conditions of the air. By determining the mass flow rate and understanding the properties of the air and rules of psychrometrics, the amount of heat added or removed from the air by the conditioning device can be quantified. Understanding system airflow is critical to understanding system performance.

The phase change of a refrigerant (from liquid to gas and back to liquid) in a closed system is what allows the refrigerant to transfer thermal energy. To determine the phase state and energy carrying capacity of a refrigerant at any point in the system both the refrigerant pressure and temperature must be known. Pressure gauges are typically used to measure refrigerant pressures and contact thermometers are used to measure refrigerant line (tube) temperatures to infer the refrigerant temperature.

Measurements as typically taken by technicians on their own mean little without knowledge of the design operation. All manufacturers of quality listed equipment have their systems tested and efficiency verified to Air-Conditioning, Heating, and Refrigeration Institute (AHRI) standards. Other independent testing laboratory standards could also be used for testing and efficiency verification. Units having an energy guide label have been tested, and their efficiency can only be guaranteed if the components are matched, the system refrigerant charge is correct, the airflow is correctly set, and the system is installed per the manufacturer's instructions including proper sizing of the equipment.

To achieve the desired efficiency, all manufacturers design their equipment to operate at its rated capacity at one set of conditions at its peak performance. These conditions are known as the AHRI Standard Conditions and are as follows:
  Indoor air=80° F.
  Relative Humidity=50%
  Outdoor air=95° F.

All equipment listed in the AHRI directory operates at rated capacity under the AHRI standard conditions. Because the AHRI standard conditions are at the high end of the normal range for human comfort, Standard Operating Conditions, or common operating conditions have been established as design conditions for the equipment in the field.
  Indoor air=75° F.
  Relative Humidity=50%
  Outdoor air=95° F.

Under these conditions the equipment can have a slightly lower operating capacity, and the equipment will operate with different operating characteristics. Along with the standard operating conditions, conditions for airflow and coil temperatures and operating range have also been established. Most if not all manufacturers design these grades of equipment for a nominal 400 CFM airflow per ton for A/C cooling, and 450 CFM/ton for heat pumps.

Government standard tests determine the energy efficiency rating of residential HVAC equipment (cite CFR). This rating is known as Seasonal Energy Efficiency Ratio, or SEER. Higher SEER ratings mean more efficient equipment. The following Tables illustrate some characteristics and nominal operating ranges for air conditioning equipment of these standard grades in certain design operating conditions:

| <10 SEER Equipment (R-22 Refrigerant) | |
|---|---|
| System Characteristics: | Nominal Operating Parameters: |
| Standard size evaporator. | Evaporator designed to be 35° F. colder than return air. |
| Standard size condenser. | |
| Fixed orifice, cap tube, or piston for metering device. | Condenser designed to be 30° F. warmer than outdoor air passing over it. |
| Design Operating Conditions: | Refrigerant in evaporator will boil at 40° F. (75° indoor air − 35° design temp difference = 40° F. Saturation Temperature). |
| Indoor air: 75° F. | |
| Relative Humidity: 50%. | |
| Outdoor air: 95° F. | Refrigerant in condenser will condense at 125° F. (95° outdoor air + 30° design temp difference = 125° F. Saturation temperature). |
| *Note: Always refer to the manufacturer specifications if possible. | |
| | Evaporator airflow = nominal 400 CFM/ton. |
| | Measured superheat should = 8-10° F. |
| | Measured sub-cooling should = 6-8° F. |

| <10 SEER Equipment (R-22 Refrigerant) | |
|---|---|
| | Suction pressure should = 68.5 PSIG (+/−2 PSIG). |
| | High side pressure should = 278 PSIG (+/−2 PSIG). |
| | Suction line temperature should be 40° F. saturation + 8-10° F. superheat = 48-50° F. |
| | Liquid line temperature should be 125° F. saturation − 6-8° F. sub-cooling = 119-117° F. |

| 10-12 SEER Equipment (R-22 Refrigerant) | |
|---|---|
| System Characteristics: | Nominal Operating Parameters: |
| Standard size evaporator. | Evaporator designed to be 35° F. colder than return air. |
| Larger size condenser. | Condenser designed to be 25° F. warmer than outdoor air passing over it. |
| Metering Device = Thermal or Thermostatic Expansion Valve (TXV). | Refrigerant in evaporator will boil at 40° F. (75° indoor air − design temp difference = 40° F. Saturation Temperature). |
| Design Operating Conditions: | Refrigerant in condenser will condense at 120° F. |
| Indoor air: 75° F. | (95° outdoor air + 25° design temp difference = 120° F. Saturation temperature). |
| Relative Humidity: 50%. | Evaporator airflow = nominal 400 CFM/ton. |
| Outdoor air: 95° F. | Measured superheat should = 8-10° F. |
| *Note: Always refer to the manufacturer specifications if possible. | Measured sub-cooling should = 6-8° F. |
| | Suction pressure should = 68.5 PSIG (+/−2 PSIG). |
| | High side pressure should = 259.9 PSIG (+/−2 PSIG).** |
| | Suction line temperature should be 40° F. saturation + 8-10° F. superheat = 48-50° F. |
| | Liquid line temperature should be 120° F. saturation − 6-8° F. sub-cooling = 114-112° F. |

**The lower discharge pressure versus standard efficiency equipment provides a smaller pressure difference across the compressor, and requires less energy to operate making the system more efficient. The higher efficiency comes at the cost of poor operation when operated in low ambient conditions. Some manufacturers have incorporated a two-speed condenser fan to rectify this problem. Even so a two speed motor and the control to operate it cost more up front. The efficiency upgrade will pay for itself.

| 12-20+ SEER Equipment (R-22 Refrigerant) | |
|---|---|
| System Characteristics: | Nominal Operating Parameters: |
| Larger size evaporator. | Evaporator designed to be 30° F. colder than return air. |
| Larger size condenser. | Condenser designed to be 20° F. warmer than outdoor air passing over it. |
| Metering Device = Thermal Expansion Valve (TXV). | Refrigerant in evaporator will boil at 45° F. (75° indoor air − 30° design temp difference = 45° F. Saturation Temperature). |
| Design Operating Conditions: | Refrigerant in condenser will condense at 115° F. |
| Indoor air: 75° F. | (95° outdoor air + 20° design temp difference = 115° F. Saturation temperature) |
| Relative Humidity: 50%. | Evaporator airflow = nominal 400 CFM/ton. |
| Outdoor air: 95° F. | Measured superheat should = 8-10° F. |
| *Note: Always refer to the manufacturer specifications if possible. | Measured sub-cooling should = 6-8° F. |
| | Suction pressure should = 76 PSIG (+/−2 PSIG). |

| 12-20+ SEER Equipment (R-22 Refrigerant) | |
|---|---|
| | High side pressure should = 243 PSIG (+/−2 PSIG).** |
| | Suction line temperature should be 45° F. saturation + 8-10° F. superheat = 53-55° F. |
| | Liquid line temperature should be 115° F. saturation − 6-8° F. sub-cooling = 109-107° F. |

**The lower discharge in combination with high suction pressure versus standard and high efficiency equipment provides a smaller pressure difference across the compressor, and requires less energy to operate making the system more efficient. The higher operating efficiency comes at the cost of lower latent heat capability, so this system may not dehumidify as well. It will also incorporate some of same the controls that the high efficiency equipment will incorporate.

| 10-12 SEER Equipment (R-410a Refrigerant)* | |
|---|---|
| System Characteristics: | Nominal Operating Parameters: |
| Standard size evaporator. | Evaporator designed to be 35° F. colder than return air. |
| Larger size condenser. | Condenser designed to be 25° F. warmer than outdoor air passing over it. |
| Metering Device = Thermal Expansion Valve (TXV). | Refrigerant in evaporator will boil at 40° F. (75° indoor air-35° design temp difference = 40° F. Saturation Temperature). |
| Design Operating Conditions: | Refrigerant in condenser will condense at 120° F. |
| Indoor air: 75° F. | (95° outdoor air + 25° design temp difference = 120° F. Saturation temperature) |
| Relative Humidity: 50%. | Evaporator airflow = nominal 400 CFM/ton. |
| Outdoor air: 95° F. | Measured superheat should = 8-10° F. |
| *Note: Always refer to the manufacturer specifications if possible. | Measured sub-cooling should = 6-8° F. |
| | Suction pressure should = 118.9 PSIG (+/−2 PSIG). |
| | High side pressure should = 416.4 PSIG (+/−2 PSIG).** |
| | Suction line temperature should be 40° F. saturation + 8-10° F. superheat = 48-50° F. |
| | Liquid line temperature should be 120° F. saturation − 6-8° F. sub-cooling = 114-112° F. |

*It should be noted: As far as operating conditions are concerned, the only difference in operation between R-22 unit and R-410a units is the operating pressures.

**The lower discharge pressure provides a smaller pressure difference across the compressor, and requires less energy to operate making the system more efficient. The higher efficiency comes at the cost of poor operation when operated in low ambient conditions. Some manufacturers have incorporated a two-speed condenser fan to rectify this problem. Even so a two speed motor and the control to operate it cost more up front. The efficiency upgrade will pay for itself.

| 12-20+ SEER Equipment (R-410a Refrigerant)* | |
|---|---|
| System Characteristics: | Nominal Operating Parameters: |
| Larger size evaporator. | Evaporator designed to be 30° F. colder than return air. |
| Larger size condenser. | Condenser designed to be 20° F. warmer than outdoor air passing over it. |
| Metering Device = Thermal Expansion Valve (TXV). | Refrigerant in evaporator will boil at 45° F. (75° indoor air − 30° design temp difference = 45° F. Saturation Temperature). |
| Design Operating Conditions: | Refrigerant in condenser will condense at 115° F. |
| Indoor air: 75° F. | |
| Relative Humidity: 50%. | |

| 12-20+ SEER Equipment (R-410a Refrigerant)* |  |
| --- | --- |
| Outdoor air: 95° F.<br>*Note: Always refer to the manufacturer specifications if possible. | (95° outdoor air + 20° design temp difference = 115° F. Saturation temperature)<br>Evaporator airflow = nominal 400 CFM/ton.<br>Measured superheat should = 8-10° F.<br>Measured sub-cooling should = 6-8° F.<br>Suction pressure should = 130.7 PSIG (+/−2 PSIG).<br>High side pressure should = 389.6 PSIG (+/−2 PSIG).**<br>Suction line temperature should be 45° F. saturation + 8-10° F. superheat = 53-55° F.<br>Liquid line temperature should be 115° F. saturation − 6-8° F. sub-cooling = 109-107° F. |

*It should be noted: As far as operating conditions are concerned, the only difference in operation between R-22 unit and R-410a units is the operating pressures.
**The lower discharge in combination with high suction pressure provides a smaller pressure difference across the compressor, and requires less energy to operate making the system more efficient. The higher operating efficiency comes at the cost of lower latent heat capability, this system may not dehumidify as well. It will also incorporate some of same the controls that the high efficiency equipment will incorporate.

When charging a refrigeration system, the following steps should be followed:

1. Inspect filters, evaporator coils, condensers coils and blower for dirt and clean if needed. If condenser is washed, let it dry before charging.
2. Make sure evaporator airflow is correct. (Nominal 400 CFM/Ton for A/C (350 CFM/ton in humid areas) 450 CFM/ton for Heat pumps)
3. Determine type of refrigerant.
4. Determine type of metering device.
5. Measure indoor/outdoor ambient air conditions (wet bulb and dry bulb).
6. Determine proper superheat or subcooling. (Use Manufacturer's chart if available.)
7. Attach Refrigeration System Analyzer (RSA) to service valve parts.
8. Attach temperature probe (to suction line for superheat measurement, to liquid line for subcooling measurement).
9. Verify refrigerant selection in manifold.
10. Determine the charging requirements Charge directly by superheat or subcooling.

Note: Watch pressures while charging by superheat and subcooling methods to assure system is operating properly. Always check evaporator and total superheat on TXV systems to assure correct TXV operation.

11. Verify system pressures and saturation temperatures are within manufacturer's design criteria.

Deviation from the correct charge will have a negative impact on the performance or operation of the refrigeration system. Systems utilizing a fixed metering device without any other mechanical problems and proper airflow and load will exhibit the following symptoms if improperly charged to a low charge (undercharge):

Low suction pressure.
Low liquid pressure.
High total superheat.
Low compressor amps.
Poor system performance.
Coil may be freezing.
Possible overheating of compressor.

Systems utilizing a fixed metering device without any other mechanical problems and proper airflow and load will exhibit the following symptoms if improperly charged to a high charge (overcharge):

High suction pressure.
High liquid pressure.
Low total superheat.
Possibly higher than normal compressor amps.
Poor system performance.
Lack of humidity control.

Systems utilizing a TXV without any other mechanical problems and proper airflow and load will exhibit the following symptoms if improperly charged to a low charge (undercharge):

Evaporator superheat normal or high.
Low condenser subcooling.
Poor performance at full or partial load.
Possible overheating of compressor.

Systems utilizing a TXV without any other mechanical problems and proper airflow and load will exhibit the following symptoms if improperly charged to a low charge (undercharge):

Evaporator superheat normal.
High liquid pressure.
High condenser subcooling.
Poor performance at full or partial load.

Industry studies show that approximately 70% of residential air conditioning systems are operating with refrigerant charge and airflow problems. Unlike lab testing done under a single set of closely held conditions, charging an air conditioning system in the field by a technician is often a complicated and dynamic process due to nonstandard conditions and constantly changing load conditions that technicians typically encounter. As load conditions change or vary from standard conditions inside or outside (ambient conditions) the conditioned space, so do performance and operational targets. System pressures, saturation temperatures, superheat, subcooling, airflow latent sensible split, power consumption, and work output all vary as the load and or the power supply (voltage) increases or decreases. Installation factors like line set length, lift in suction line insulation, and duct design also affect performance. Additionally as a system is serviced (particularly as refrigerant is added or removed) the operational characteristics again vary as the system reaches a new point of equilibrium which again changes the capacity and the rate which the sensible and latent load is handled. Determining when this new state of equilibrium is reached is also a challenge that can lead to excessive wait times to complete service.

Due to a constantly moving target, and variables associated with the installation often not accounted for in the field, acquisition and management of the data used to resolve the target performance indicators must also be as dynamic as the system itself to more accurately evaluate the performance of the system in field practice. Managing all of the data independently and manually requires the technician to carefully and quickly gather the measurement data, use several look up tables, and make manual calculations which can result in many errors from simple transcription to that of calculation or even resulting change in load conditions faster than the data can be hand obtained. Additionally, readings and calculations are not humanly possible in real time; and the variables are changing in real time presenting, at best, a fuzzy picture of the operational performance. These problems are amplified under low load and during periods of low ambient conditions due to system characteristics and the short amount of time that the system operates to satisfy the load requirements. Manual calculation is less accurate and subject to more error and cumbersome techniques making it often impractical to do in many field installations.

SUMMARY OF THE INVENTION

The smart HVAC manifold system is designed to constantly and dynamically manage the data acquisition process and to measure and calculate the performance indicators and output as the load conditions and/or equipment operation change, taking into account variables in the installation that can impact performance. Both visually, and by a very specific data sets, the performance of the equipment and the installation can quickly be assessed and specific problems identified along with suggestions of typical faults or problems that may need addressed by the technician.

The smart HVAC manifold system also provides a means of quickly and electronically handling the manual data acquisition process which would include component and/or brand, system model and serial numbers, equipment location (Global Positioning System (or GPS) tagging), customer name, environmental conditions that effect performance and performance measurement (weather data and elevation), and supports photo, voice and text documentation. These features streamline data acquisition, allow remote support, and minimize transcription errors also preventing data manipulation (gaming of the input of false, repeated or physically impossible data) by technicians when servicing equipment or commissioning or retro commissioning the system.

The smart HVAC manifold system can quickly lead a technician in the right direction with onboard diagnostics. By making real time measurements and comparing those measurements to engineered data, the smart HVAC manifold system can help a technician isolate the potential problem and suggest possible solutions to typical charge airflow and load related problems. This approach streamlines the troubleshooting process making the technician faster and more accurate at isolating the fault in the system.

Remote troubleshooting problems plague the HVAC industry today due to time consuming, frustrating, and tedious processes and the need to provide remote support to a struggling technician facing a large number of variables in assessing performance and troubleshooting substandard operation of air-conditioning equipment. The smart HVAC manifold system will allow for remote access to measurement data from anywhere in the world via a wireless internet connection. This allows for remote support from the manufacturer or a lead technician or a master technician to assist the field technician. Also the smart HVAC manifold system platform will allow for photo and/or video documentation as a "second set of eyes" at the equipment/installation site along with weather and location data providing additional information that will aid in the remote troubleshooting process. From the remote location any interested party may view (in real-time) the actual equipment performance.

To achieve the best performance, test instruments used in HVAC system evaluation should be tested for accuracy or calibrated on a regular basis. Field calibration verification is often done with a pure refrigerant at a known saturation temperature or pressure and with a reference instrument or a reference measurement, such as a distilled water ice bath. The smart HVAC manifold system allows for calibration offset through the software and into the tool within a predefined limit. Sensors can be offset to a reference or averaged. Because many of the measurements are differential and not absolute, the ability to provide an averaging offset allows for higher accuracy when determining a change in temperature or enthalpy across a coil. This field calibration process also allows the tool to meet energy efficiency program requirements (programs are often run by utilities and/or their consultants) that specify a calibration verification and a calibration protocol.

DESCRIPTION OF DRAWINGS

FIGS. 6-13 illustrate example configurations of the system.

DESCRIPTION

Figure 1:
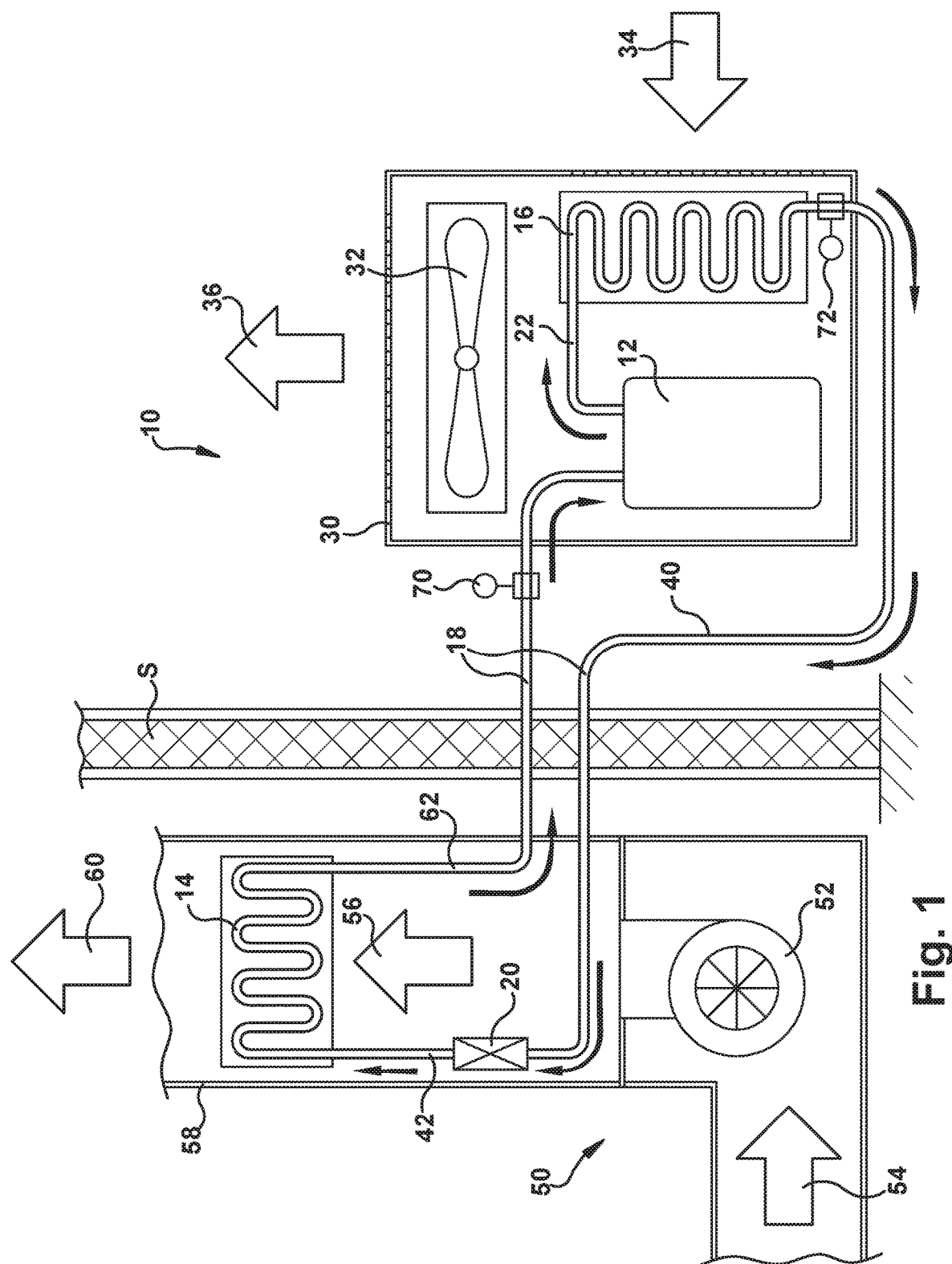
FIG. 1 is a schematic illustration of an HVAC system.

The invention relates to HVAC systems. More specifically, the invention relates to a system that includes an apparatus and method for monitoring the operation of A/C units; acquiring, managing, sharing, and reporting data related to the A/C units; assessing the performance of A/C units; and installing, troubleshooting, and servicing the A/C units. One particular unit to which the invention relates is shown in FIG. 1, which illustrates an air conditioning (A/C) unit 10 for providing cooled air in structure S. The structure S could be in the form of a building (air conditioning) or a cooler or refrigerated enclosure (refrigeration). Other forms of A/C units 10 include, but are not limited to: variable refrigerant flow systems (VSRs), two stage A/C systems, heat pumps, two stage heat pumps, freezers, meat cases, open cases, and low temperature refrigeration units.

The A/C unit 10 shown in includes a compressor 12, an evaporator 14, a condenser 16, and an expansion device 20. The expansion device 20 may, for example, be a fixed orifice device, capillary tube device, piston device, or thermostatic expansion valve (TXV). Refrigerant flows through piping 18 in a direction indicated generally by arrows in FIG. 1. The refrigerant flows from the compressor 12, through the condenser 16, through the expansion device 20, through the evaporator 14, and back to the compressor 12.

The compressor 12 and condenser 16 are housed, along with a fan 32, in a housing 30 situated outside the structure S. The compressor 12 delivers high temperature, high pressure superheated refrigerant in vapor form to the condenser 16 via hot gas or discharge line 22. The fan 32 draws ambient air 34 into the housing 30 through coils of the condenser 16. The condenser 16 transfers heat from the heated refrigerant in the coils to the ambient air 34, and the fan 32 discharges the heated discharge air 36 from the housing 30. The refrigerant vapor in the condenser 16 cools as it transfers heat to the ambient air 34.

As the refrigerant cools, it changes from a vapor to a liquid by desuperheating, saturating and finally subcooling. The liquid refrigerant leaves the condenser 16 as a subcooled liquid and flows as a medium temperature, high pressure liquid through liquid line 40 to the expansion device 20. The refrigerant undergoes a pressure drop through the expansion device 20, which causes flashing of some of the liquid to vapor, (Flash Gas) and resulting temperature drop as some of the refrigerant changes state from liquid to vapor of the now saturated liquid refrigerant.

Low pressure, low temperature saturated liquid refrigerant flows into the evaporator 14 via distributor line 42.

The evaporator 14 and expansion device 20 are housed in a forced draft unit 50 (e.g., furnace blower) situated inside the structure S. The unit 50 includes a blower 52 for inducing a draft of return air 54 into the unit. The blower 52 forces the forced air 56 through the evaporator 14 and into duct work 58. As the forced air 56 passes through the evaporator 14, it exchanges heat with the low pressure, low temperature refrigerant in the evaporator coils. Cooled and dehumidified supply air 60 exits the evaporator 14 and is distributed into the structure S through the duct work 58. As the forced air 56 adds heat to the refrigerant in the evaporator 12, the refrigerant transitions to a vapor phase, leaving the evaporator through vapor line 62. The low pressure, low temperature superheated refrigerant in vapor line 62 refrigerant then flows into the compressor 12 to complete the cycle of refrigerant flow through the A/C unit 10.

For purposes of evaluating and testing the unit 10, low side temperature and pressure measurement in the vapor line 62 can be performed at low side port 70. The temperature and pressure of the refrigerant leaving entering the compressor 12 through the vapor line 62 can be measured at the low side port 70. These measurements can be performed, for example, to check unit superheat (suction line temperature minus evaporator saturation temperature). The suction line temperature is measured at low side port 70 and the evaporator saturation temperature is approximated using measured suction line pressure (again taken at low side port 70) along with pressure-temperature charts/look-up tables for the particular type of refrigerant used in the unit 10.

Additionally, for purposes of evaluating and testing the unit 10, high side temperature and pressure measurement can be performed at high side port 72. The temperature and pressure of the refrigerant leaving the condenser 16 through the liquid line 40 can be measured at the high side port 72. These measurements can be performed, for example to check unit sub-cooling (condenser saturation temperature minus liquid line temperature). Liquid line temperature is measured at high side port 72 and condenser saturation temperature is approximated using measured liquid line pressure (again taken at high side port 72) along with pressure-temperature charts/look-up tables for the particular type of refrigerant used in the unit 10.

In a single example, the superheating and sub-cooling data acquired from the unit can be used by a technician to determine whether the unit 10 is in operating normally or is in a state of overcharge or undercharge. If overcharge or undercharge is indicated, the technician can take corrective steps to bring the unit back to normal/optimal operation by adding or removing refrigerant. Such corrective actions, being unit and manufacturer specific, are far too numerous to describe in any detail greater than that which has already been described herein.

The system of the invention is a smart HVAC manifold system for use in the installation, maintenance, and servicing of A/C units, particularly air conditioning and refrigeration units. The system accounts for both the mechanical refrigeration system and also measures changes in the conditioned medium along with electrical characteristics to determine the efficiency of the air conditioning process. The system can perform or assist in performing tasks, such as measuring operating parameters of the unit, measurement conditioning outside of standard conditions, measurement verification, data acquisition (including management, sharing, and reporting), and verifying, quantifying, and troubleshooting unit performance. The system is intended for use by service technicians, maintenance personal, installers, verifiers, operators, mechanics, and any other personnel that may be interested in the operation of A/C units. The scope of the invention and its associated applications will become apparent through this description of the invention and the associated figures.

Figure 2:
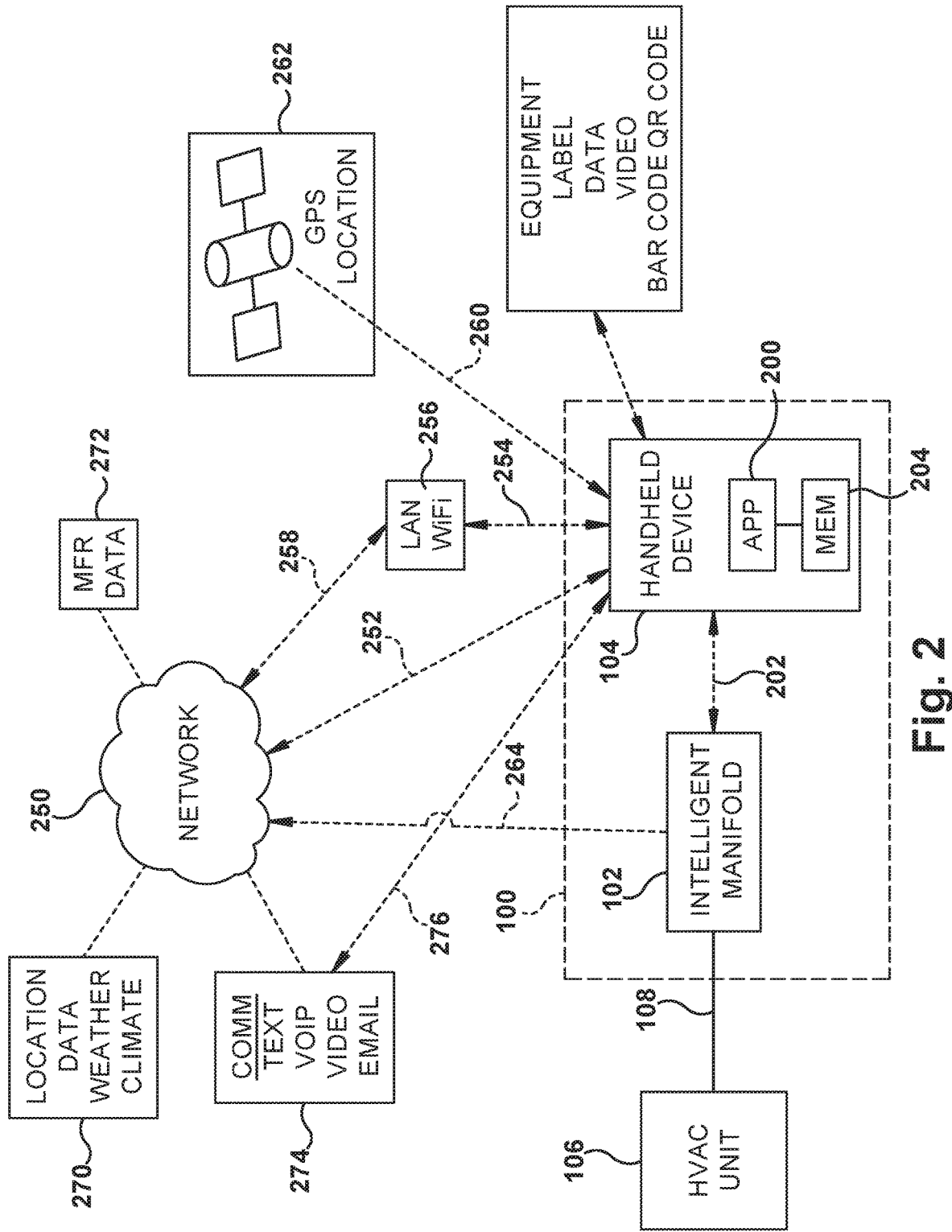
FIG. 2 is a block diagram illustrating a smart HVAC manifold system of the invention.

FIG. 2 illustrates the smart HVAC manifold system 100. The system 100 includes an smart manifold 102 and a smart platform 104 for communicating with the manifold. In one aspect, the smart platform 104 can be a smart phone or tablet PC or other computing device. The smart platform 104 may have alternative constructions. For example, the smart platform 104 could be a tablet pc, a portable laptop computer, or even a unique, custom OEM device. In this description, for simplicity, the smart platform 104 is described and illustrated as a smart phone.

The smart manifold 102 connects to an A/C unit 106 to measure data (e.g., pressures and temperatures). The unit 106 may, for example, be similar or identical to the unit 10 illustrated in FIG. 1. Using this example to reference, the manifold 102 thus can be adapted to read high-side & low-side pressures via ports 72 and 70, and can be adapted to read high-side & low-side temperatures in lines 62 and 40. The unit 102 includes a plurality of connections 108 for facilitating these measurements.

The smart manifold 102 is a measurement platform for passing data to the smart platform 104. Advantageously, in a smart phone/tablet implementation of the smart platform 104, the smart manifold 102 takes advantage of the large, high resolution screen real estate, the native GPS features, and the native communications and video system. The system 100 uses the smart manifold 102 and smart platform 104 in combination to perform measurements required for commissioning HVAC systems. Additionally, this combination provides computational power to provide an intelligent platform for simple and complex diagnostics of equipment operation and problems. The smart manifold 102, in combination with the smart platform 104 offers a powerful communications platform to allow users to share information with consumers, owners, utilities, equipment manufacturers, and other interested parties and/or service providers. Data can be input into the application using voice to text, text, video, photo, Optical Character Recognition (OCR), on-screen or wireless input devices (e.g., Bluetooth keyboard, Bluetooth headset, mouse), and data streaming from the manifold.

The smart manifold 102 includes sensors that may be wired and/or wireless. Standard core sensor technology will include pressure, and wired temperature sensors (e.g., outdoor air, liquid line, suction line, discharge line). Additional wired or wireless sensors can sense environmental and operating conditions such as wireless temperature & humidity (wet-bulb and dry-bulb; supply air and return air), equipment current, voltage, air velocity, and static pressure. The smart manifold 102 can support the following standard measurements:

Low side pressure.
High side pressure.
Outdoor air temperature.
Liquid line temperature.
Suction line temperature.
Discharge line temperature.

The smart manifold 102 can also support the following advanced measurements:

Wireless three phase/single phase compressor current.
Wireless single phase indoor blower current.
Wireless supply air temperatures (wet bulb and dry bulb).

Wireless return air temperatures (wet bulb and dry bulb).
Wireless temperature×4 (line temperatures/air temperatures).
Static pressure test—airflow.
Airflow measurement from TruFlow® Grid
Airflow measurement from vane, hot wire or capture hood
More could be added if desired/required.
Compressor oil pressure.
Refrigerant system vacuum during service.

Figure 3:
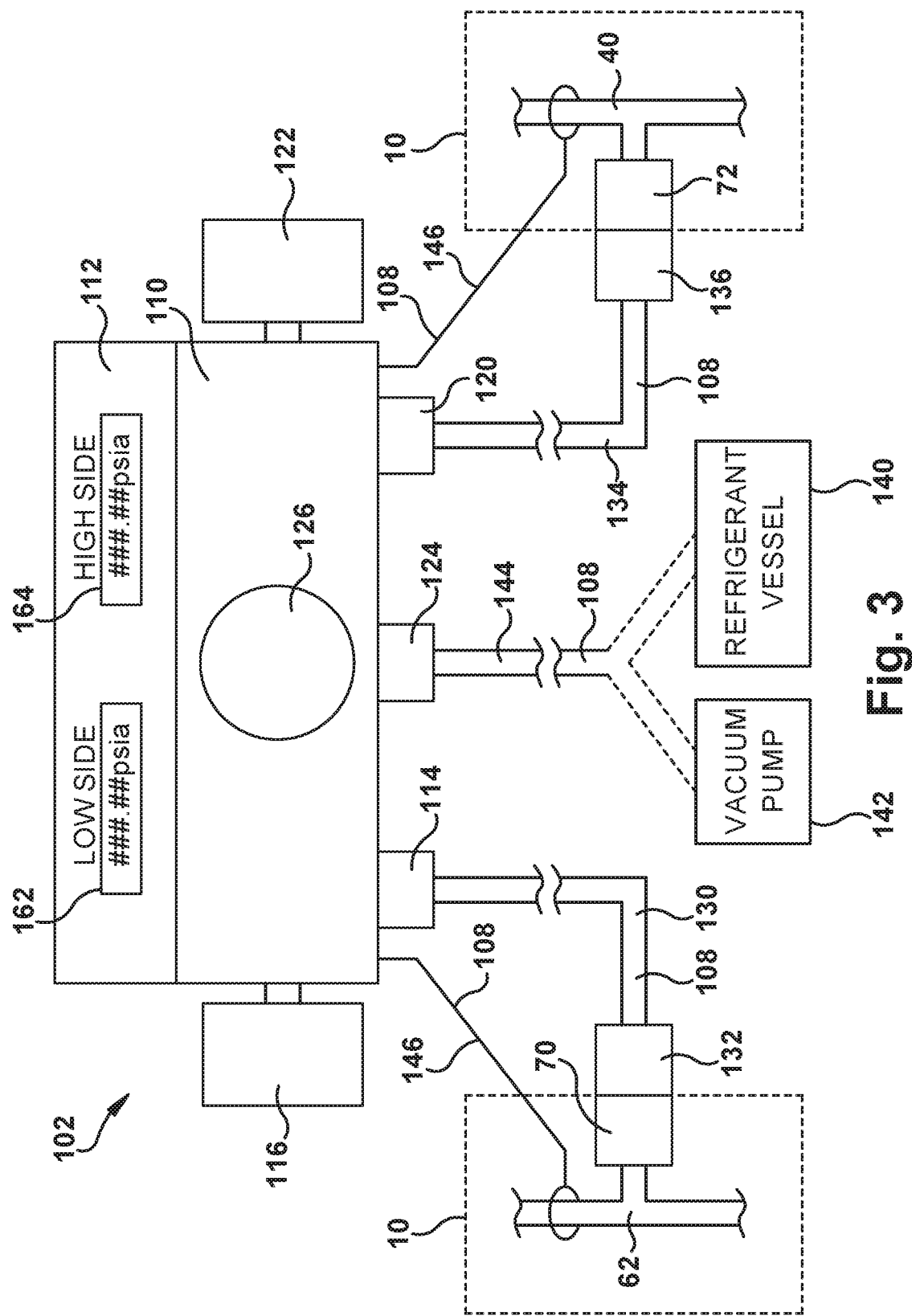
FIG. 3 is a schematic illustration of a portion of the system of FIG. 2.

FIG. 3 illustrates an example embodiment of the smart manifold 102 in greater detail. The manifold 102 includes a refrigerant manifold 110 and an electronics unit 112. The smart manifold 102 (at least the electronics unit 112) may be housed in an enclosure with an ingress protection rating of IP-42 to withstand light rain. The smart manifold 102 can be designed to operate in a −40° C. to +85° C. operating temperature range.

The refrigerant manifold 110 is what is referred to in the art as a "three valve manifold." The manifold 110 could have alternative configurations, such as a two-valve or four-valve configuration. All of these configurations are well known in the field of HVAC service and technology. The manifold includes a low-side port 114 and a low-side handle 116 for opening/closing a valve (not shown) associated with the low-side port. The manifold 110 also includes a high-side port 120 and a high-side handle 122 for opening/closing a valve (not shown) associated with the high-side port. The manifold further includes a refrigerant/vacuum port 124 and a refrigerant/vacuum handle 126 for opening/closing a valve (not shown) associated with the refrigerant/vacuum port. The manifold 110 also can include a low side gauge 162 and a high side gauge 164 for reading those respective pressures directly without use of the smart platform 104. The manifold 110 can be configured such that the gauges 162 and 164 illustrate temperatures in Fahrenheit or Celsius and pressures in PSIA, PSIG, KPa, MPa, or any other desired units. The manifold 110 can include additional ports for measuring pressure, temperature, or other HVAC system operating conditions or environmental conditions.

The low-side port 114 is connected to the low-side line 62 of the A/C unit 10 at the low-side port 70 via one of the connections 108 which, in this instance, includes a low-side hose 130 and a fitting 132 for connecting with the low-side port 70. The high-side port 120 is connected to the high-side line 40 of the A/C unit 10 at the high-side port 72 via one of the connections 108 which, in this instance, includes a high-side hose 134 and a fitting 136 for connecting with the high-side port 72. The refrigerant/vacuum port 124 is connected via a connection 108 to either a refrigerant vessel 140 or a vacuum pump 142, depending on whether refrigerant is to be added or removed from the unit 10. In this instance, the connection 108 includes a refrigerant hose 144 and appropriate fittings (not shown) for connecting with the refrigerant vessel 140 or vacuum pump 142. The low-side handle 116, high-side handle 122, and refrigerant/vacuum handle 126 are operable in a known manner to place the manifold in a condition for measuring high-side and low-side pressures, for adding refrigerant to the unit 10, and for removing refrigerant from the unit 10.

To obtain temperature measurements for the refrigerant in the unit 10, the connections 108 may also include low-side and high-side temperature probes 146 for measuring one or more refrigerant line or air temperatures. The temperature probes 146 may, for example, comprise thermocouple or thermistor sensors with appropriate connectors, such as clamps, for connecting the probes directly to the low-side and high-side refrigerant lines 62 and 40. Although the probes 146 are illustrated in FIG. 3 as leading from the refrigerant manifold 110, the probes could lead from the electronics unit 112.

Figure 4:
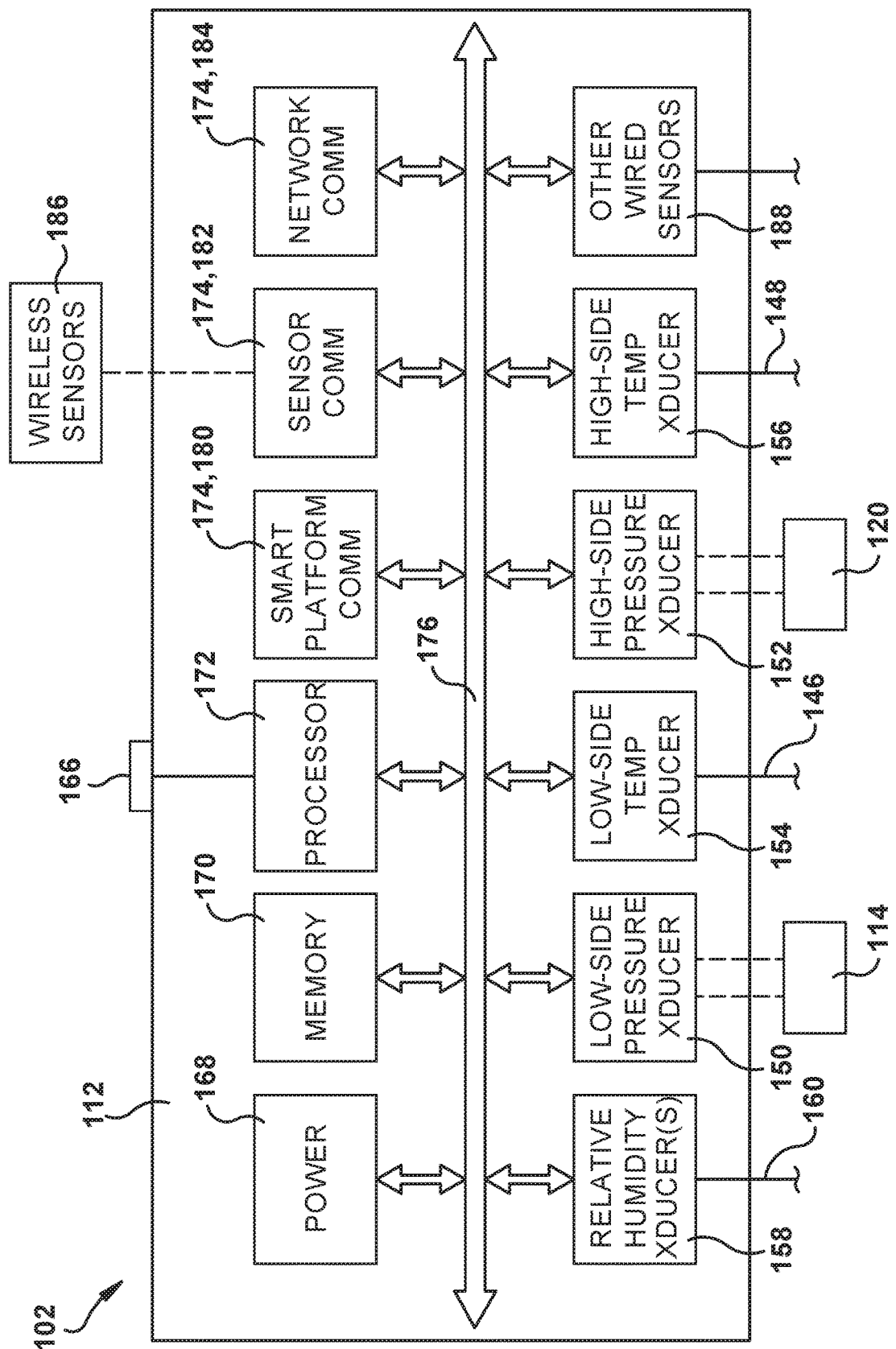
FIG. 4 is a block diagram illustrating another portion of the system of FIG. 2.

Referring to FIG. 4, to obtain pressure measurements, the smart manifold 102 includes low-side and high-side pressure transducers 150 and 152 that are operatively connected so as to be exposed to the refrigerant line pressures via the low-side and high-side ports 114 and 120 of the refrigerant manifold 110. Although the pressure transducers 150 and 152 are illustrated as portions of the electronics unit 112, portions of the transducers, or even the entire transducers, could be housed in the refrigerant manifold 110. The pressure transducers 150 and 152 are operative to convert the line pressures to digital signals representative of the sensed pressures. Those skilled in the art will appreciate that this conversion would include signal processing, such as input buffering, calibration, and analog to digital conversion (ADC). These and other such processing functions are well-known and, for simplicity, are illustrated generally as the pressure transducers 150 and 152 illustrated in FIG. 4.

To obtain temperature measurements, the smart manifold 102 includes low-side and high-side temperature transducers 154 and 156 that are operatively connected to the temperature probes 146. Although the temperature transducers 154 and 156 are illustrated as portions of the electronics unit 112, portions of the transducers, or even the entire transducers, could be housed in the refrigerant manifold 110. The temperature transducers 154 and 156 are operative to apply a voltage to the thermocouples of the probes 146 and sense changes in current representative of changes in electrical resistance in the thermocouples due to temperature change. The temperature transducers 154 and 156 convert the currents to temperature indications and provide digital signals representative of the sensed temperatures. Again, those skilled in the art will appreciate that this conversion would include signal processing, such as input buffering, calibration, and analog to digital conversion. These and other such processing functions are well-known and, for simplicity, are intended to be encompassed within the temperature transducers 154 and 156 illustrated in FIG. 4.

The smart manifold 102 can be configured to include a number of ports selected to provide the desired measured conditions of the HVAC unit 10. For example, the smart manifold 102 can include four probes for temperature, four ports for pressure, and two ports for vacuum and oil pressure as auxiliary probes. Two of the temperature ports can be used to measure discharge line temperature and the outdoor air temperature.

To obtain relative humidity and temperature measurements of the conditioned medium, the smart manifold 102 can include one or more relative humidity transducers 158 that are operatively connected to one or more humidity/temperature probes 160. Although the relative humidity transducers 158 are illustrated as portions of the electronics unit 112, portions of the transducers, or a device to transmit their readings to the manifold. The relative humidity transducers 158 are operative to sense the relative humidity and temperature in the vicinity of the probes and provide electrical signals representative of the sensed relative humidity and temperature, which can be converted to digital signals representative of the humidity and temperature. Again, those skilled in the art will appreciate that this conversion would include signal processing, such as input buffering, calibration, and analog to digital conversion. These and other such processing functions are well-known and, for simplicity, are intended to be encompassed within the relative humidity and temperature transducers 158 illustrated in FIG. 4.

The smart manifold 102 can be adapted to include multiple configurations in which multiple pressure/temperature ports are built into the unit architecture. For example, in one construction, there can be 4 probes for temperature built into the unit as well as 4 ports for pressure, the remaining two for vacuum and oil pressure as auxiliary probes. The other two temperature ports will be to measure discharge line temperature and the outdoor air temperature.

The smart manifold 102 also includes one or more memory modules 170, one or more processing modules 172, and one or more communications modules 174 that are operatively connected to each other, for example, via a communication and data bus 176. As shown in FIG. 4, the communication modules 174 can include a smart platform communications 180, sensor communications 182, and network communications 184. The manifold 102 may also include a wakeup button 166 operatively connected to the processing module 172. In the illustrated configuration, the pressure transducers 150, 152, and the temperature transducers 154, 156 are also operatively connected to the bus 176. In this manner, the processor 172 can execute instructions (e.g., applications, program files) stored in the memory module 170. The processor 172, e.g., a microcontroller having a processor and memory for storing firmware for controlling the processor, can read data from the memory module 170, can manipulate the data in accordance with the executed instructions, and can write data to the memory module for storage. The processor 172 can also retrieve sensed pressure and temperature data from the transducers and can write that data to the memory module 170 at specified capture rates and durations. The processor 172 can also perform calculations, such as superheat and sub-cooling calculations. The processor 172 can also execute instructions to transmit and/or receive data via the communications module 174. The smart manifold 102 can be configured for extended duration capture times, such as up to 99 hours (eg. 178,200 records at max 2-second capture time, 99 records at 1-hour capture time).

The smart manifold 102 also includes a power module 168 that provides power for the various components of the electronics unit 112. For simplicity, the power module 168 is illustrated as supplying power via the bus 176, in which case the bus would be of a split design where power and data/communication signals are isolated from each other. The power module 168 could, however, supply power to the various components in any known manner. The power module 168 may include rechargeable batteries, disposable batteries, an external power supply, or a combination of these sources.

The communications modules 174 supports communications between the smart manifold 102 and the smart platform 104 via the smart platform communication module 180. The smart platform communication module 180 can be, for example, Bluetooth, Bluetooth Low Energy (e.g., Bluetooth 4.0, or "Bluetooth Smart") and/or Wi-Fi communications, since the smart platform 104 (e.g., smart phone, tablet computer, or PC) is typically adapted for either form of wireless communication. Advantageously, as shown in FIG. 2, the smart platform 104 also has built-in mobile communication (3G/4G or the latest standard) and communication via Wi-Fi, which gives the smart HVAC manifold system 100 the data, voice, video, and internet communication capabilities. Further, the smart platform 104 also has global positioning system GPS capabilities, which further enhances the capabilities of the system 100.

The network communication module 184 provides communication with the network 250 (see FIG. 2) via Wi-Fi, wired Ethernet, cellular, or satellite. The sensor communication module 182 supports wireless communication between the smart manifold 102 and any wireless sensors 186. The wireless sensors 186 can, for example, sense low side pressure, high side pressure, outdoor air temperature, liquid line temperature, suction line temperature, discharge line temperature, compressor motor current, indoor blower current, supply air temperatures (wet bulb and dry bulb), return air temperatures (wet bulb and dry bulb), line temperatures, air temperatures, static pressure, airflow measurement, compressor oil pressure, refrigerant vacuum, local weather, weight (refrigerant scale) data, other air quality parameters ($CO_2$ Carbon Dioxide, particulates, etc), etc. Additionally, any of these sensed conditions can be transmitted to the smart manifold 102 via one or more wired sensors 188.

Example Configuration of the Smart manifold

In one example configuration of the smart manifold 102, the processor 172 may comprise a Freescale Kinetis K20™ microcontroller, which includes a processing unit and non-volatile memory for storing firmware. The communications module 174 may comprise a single-mode Bluetooth Low Energy (BLE) radio, with an optional ZigBee™ radio, and USB On-the-Go (OTG) capabilities. In addition to on-board volatile/non-volatile memory (e.g., VRAM, NVRAM) the memory module 170 may also include an external memory card slot, such as an SD memory card slot. The power module 168 may comprise a rechargeable lithium battery, a charge management integrated controller (IC), and a wakeup button. The smart manifold 102 can include up to four each of the temperature and pressure transducers. The transducers are mounted to a refrigerant manifold 110 and the electronics are housed within an IP rated (e.g., IP-42) enclosure. The microcontroller unit (MCU) processor 172 is the primary processor within the smart manifold 102 and is responsible for performing all measurements.

In this example configuration of the smart manifold 102, the MCU executes instructions from the firmware to perform several functions. The MCU performs analog-to-digital conversions for all attached sensors and performs averaging and signal conditioning for each measurement channel. The MCU transfers all measurement data to the Bluetooth radio module and instructs the Bluetooth module to receive incoming connections and transmit measurement data. Additionally, the MCU can bring the smart manifold 102 into a sleep state when not in use and wakes up the manifold when the button is pressed.

Additionally, the MCU executes instructions from the firmware to acquire and publish data from the pressure sensors and temperature sensors. To do so, the MCU executes firmware instructions to configure each analog-to-digital conversion (ADC) module to acquire a digital sample from each sensor channel, advance to the next channel after each acquisition. Each sample is converted to a floating-point value, incorporating minimum/maximum limits and calibration data in the conversion. The acquired sample is stored in a rotating buffer containing the last N samples. An averaging function is performed over the last N samples to produce a single, stable measurement value for each channel. This value is placed in the data store.

Additionally, in this example, the smart manifold 102 provides all measurement data to a remote system (e.g. smartphone) via the Bluetooth communication. To do this, the MCU executes firmware instructions to convey the data to the BLE module of the communications module 174 for transmission. The BLE module runs firmware built by a special tool provided by the module manufacturer. The BLE firmware implements a GATT (Generic Attribute) profile specific to the smart HVAC manifold system 100, which allows a BLE host to retrieve each measurement from the smart manifold 102. To configure the firmware, the developer edits XML files describing the GATT profile for the application and the hardware configuration of the module, then runs the tool which generates the firmware image. The GATT attribute data is transferred via a universal asynchronous receiver/transmitter (UART) between the two devices using a simple serial protocol defined by the module manufacturer. The MCU does not need to manage any of the Bluetooth-specific functions; it only provides the measurement data to the BLE module. The BLE module manages all Bluetooth-specific functions and notifies the MCU when certain events occur, such as connects, disconnects, and reboots.

In this example, the smart manifold 102 employs a low power management strategy in which the electronics unit 112 is powered by an internal rechargeable lithium battery. The battery is recharged through the micro-USB port and requires no MCU intervention. The MCU needs to keep itself and the Bluetooth radio in a low-power state when the device is not being used, to prevent battery drain. The MCU also needs to wake up when either the pushbutton is pressed or the Bluetooth radio wakes up from an over-the-air request. When woken up, the MCU will stay awake for as long as an active Bluetooth connection is maintained. After the connection is closed, the MCU will stay awake for a short amount of time and then go to sleep. The MCU can sleep the radio by software command and wake it up via general-purpose I/O (GPIO).

The smart platform 104 can include a custom mobile application that can communicate with the smart manifold 102 for the purposes of data acquisition and analysis, as well as device calibration and other interactive functions. The communication between the smart manifold 102 and smart platform 104 can be performed via Bluetooth Low Energy (Bluetooth 4.0, or "Bluetooth Smart") radio. Bluetooth Low Energy (BLE) radio. BLE is a new Bluetooth standard for low-power or battery-operated devices which allows rapid exchange of data using a connectionless protocol, eliminating the time required to re-establish a connection between two devices. BLE functionality is implemented in many newer smartphones and tablets such as the iPhone 4S™, iPhone 5™ iPad™ 3rd gen (Retina), Nexus7™ Galaxy S III™, and Droid Razr™. While a smart phone with a touch screen interface is described herein, the smart platform 104 could have an alternative form, such as a tablet device, a tablet PC, or a portable laptop PC and could use alternative interface, such as a keyboard, mouse, track pointer, voice recognition, gestures, etc.

The smart manifold application ("manifold app") 200 is installed on the smart platform 104 (see FIG. 2). The manifold app 200 communicates locally with the smart manifold 102 via communication link 202 (e.g., Bluetooth, BLE, or Wi-Fi (802.11) communication) to send and receive data and commands. This local communication function is configured to discover and list nearby devices, e.g., smart manifolds 102, in order to allow the user to select and connect to the device. Storing identification and other data, such as manufacturer data, test data, maintenance records, previous settings, etc., the manifold app 200 can reconnect quickly to previously used devices and retrieve the data associated with the device. The manifold app 200 is also configured to display a live stream of data from the selected device and record received data to smart platform memory 204 (either internal or SD).

Figure 5C:
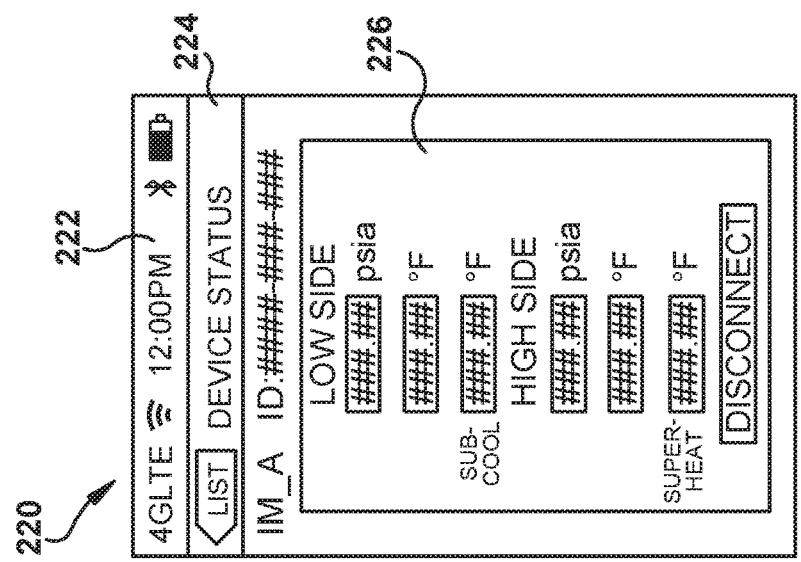
FIGS. 5A-5C are illustrations of display screens that may be employed by the system of FIG. 2.
Figure 5B:
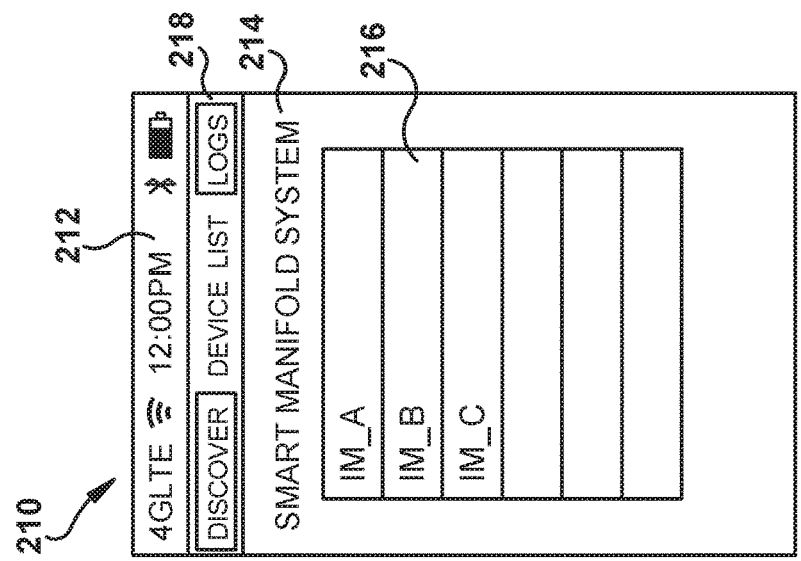
Figure 5A:
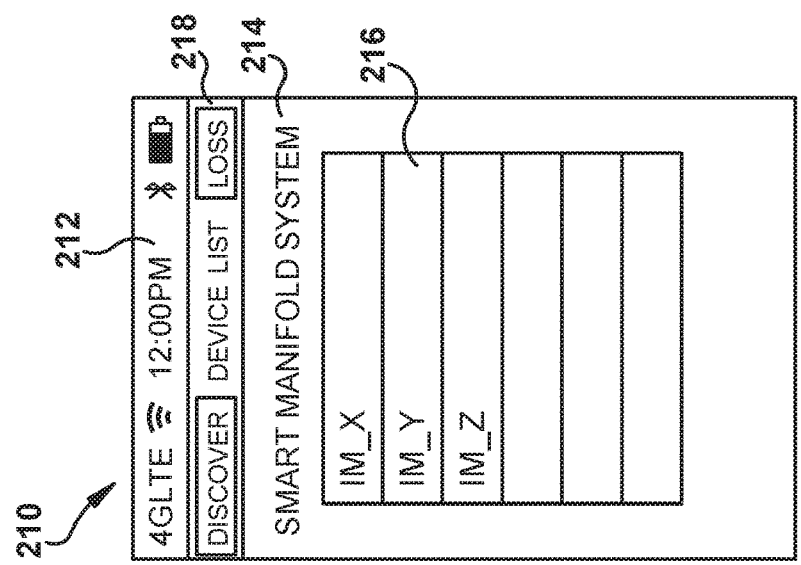
Figure 6:
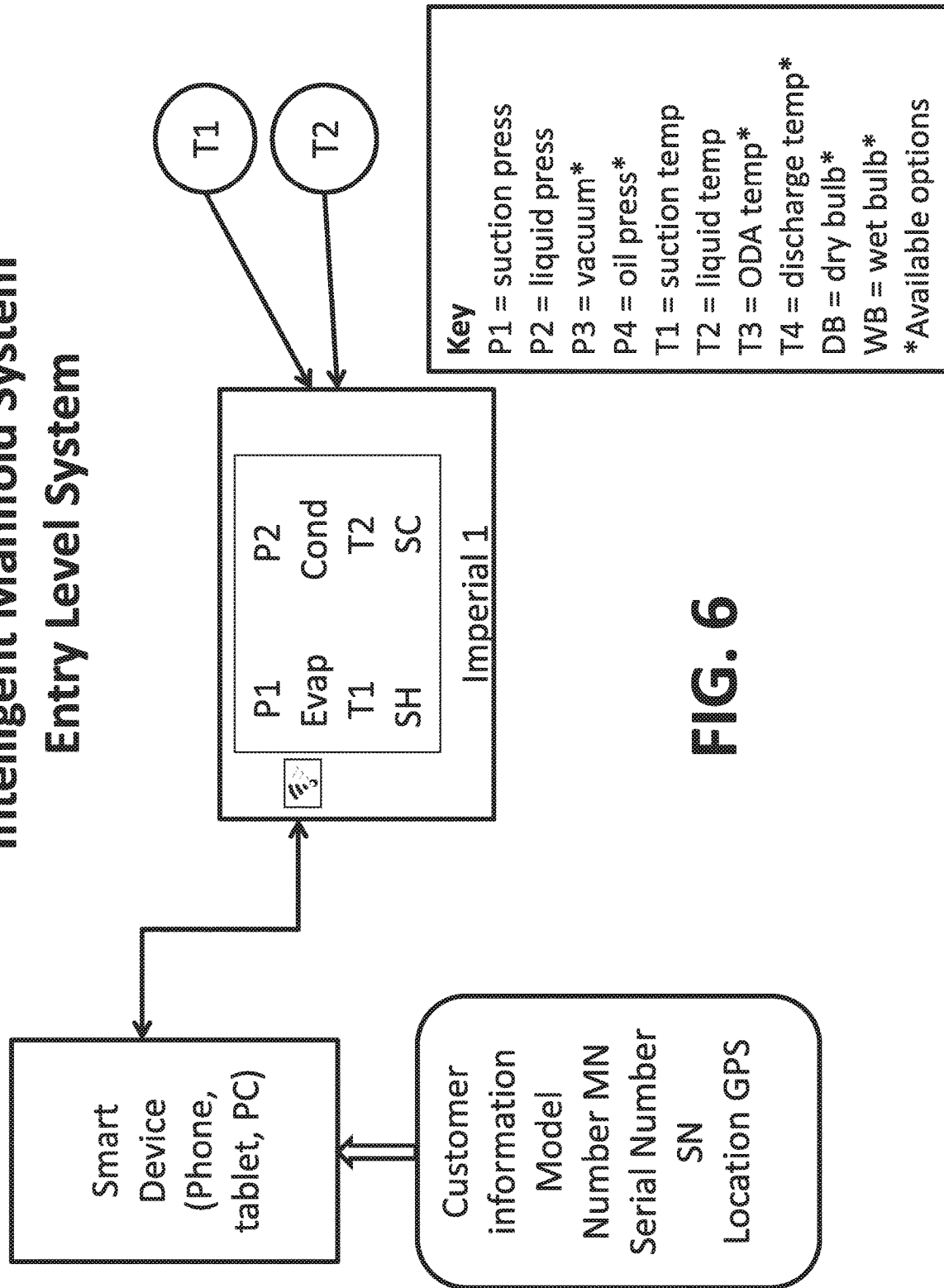
Figure 8:
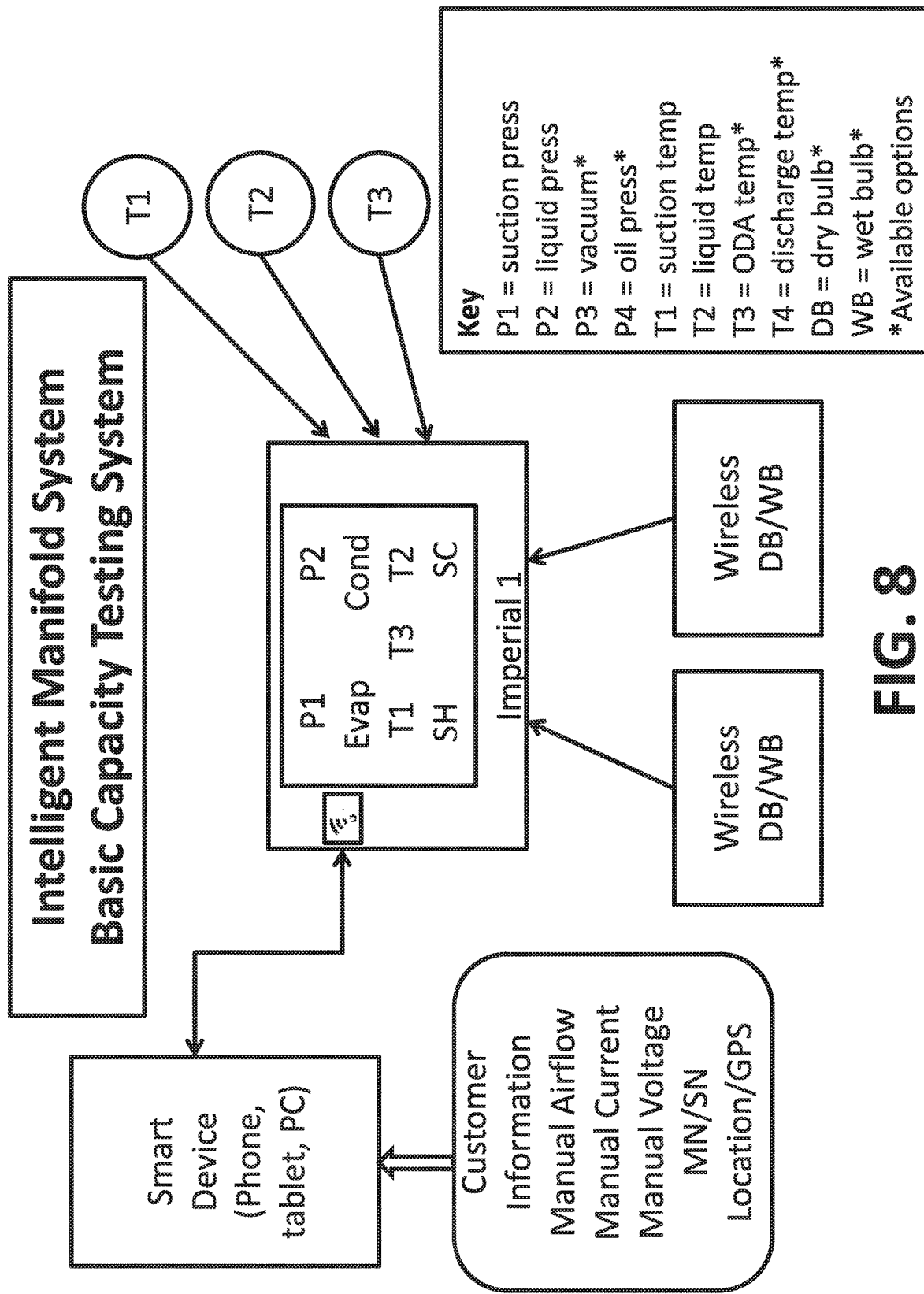
Figure 10:
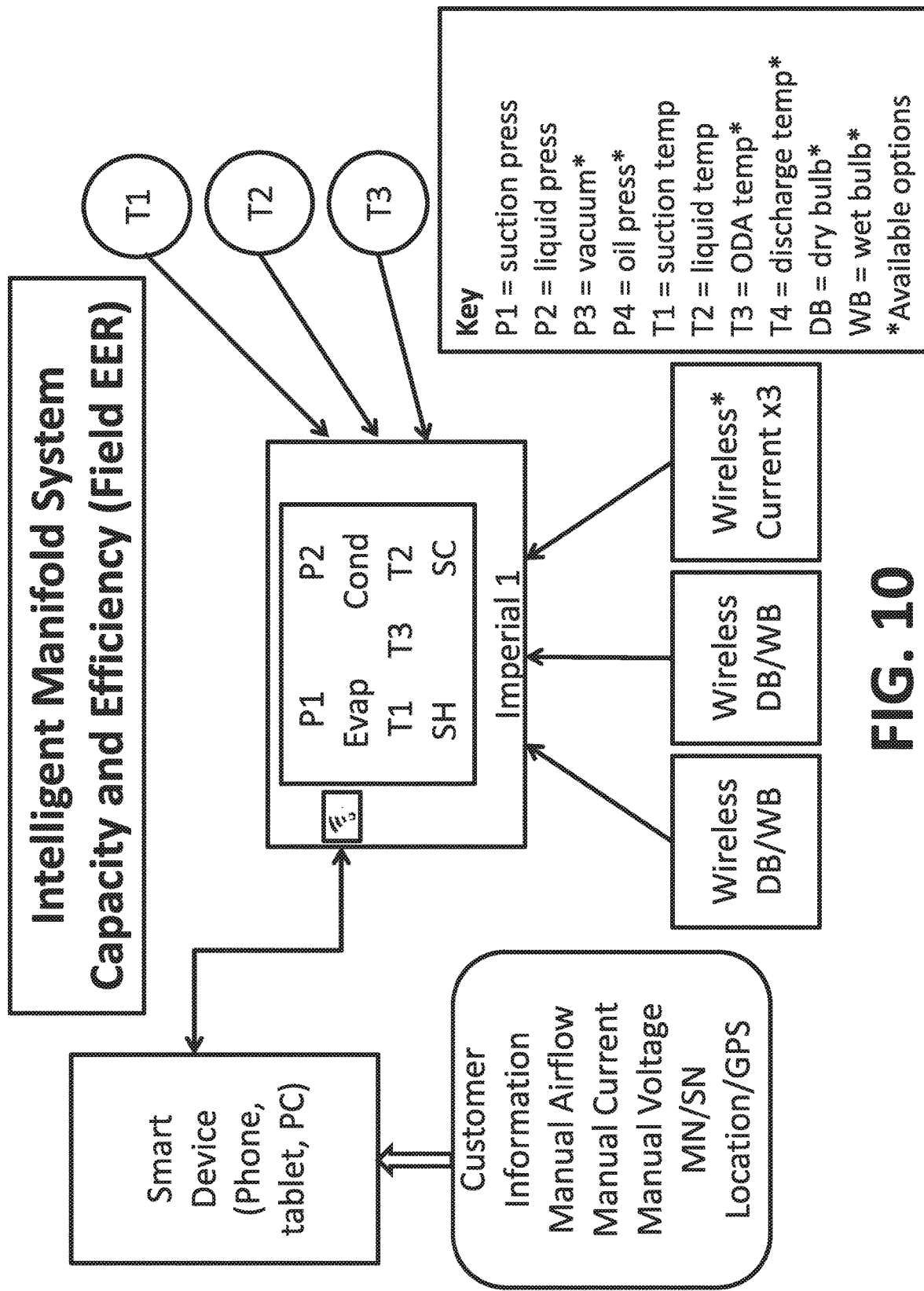
Figure 12:
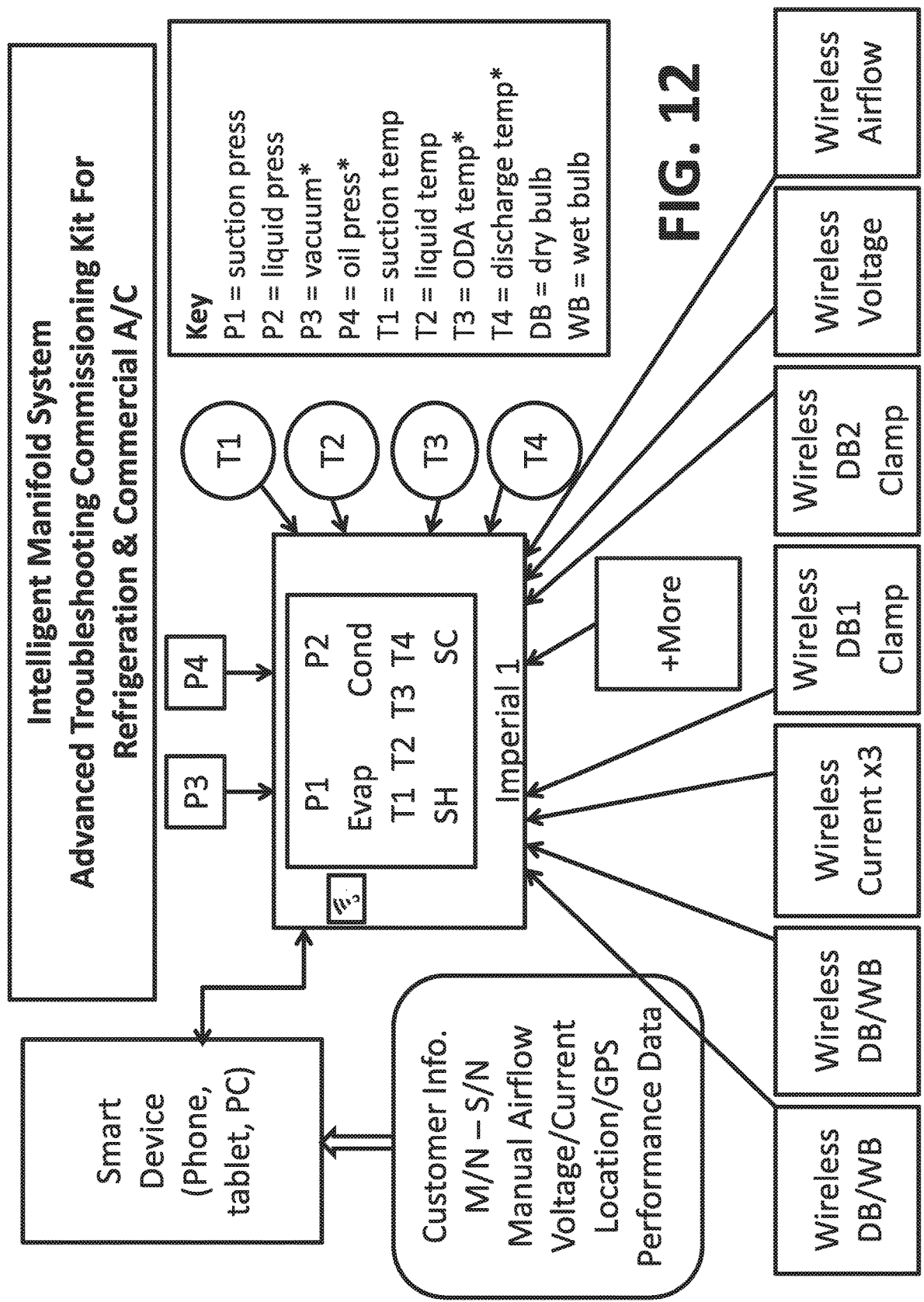

An example of an initial screen 210 of the manifold app 200 is illustrated in FIG. 5A. The initial screen 210 may contain a smart platform status portion 212, where data such as cellular wireless connectivity status, WiFi connectivity status, time of day, Bluetooth connectivity status, and battery charge. The initial screen can also include an application identification portion 214 for title, logo, etc. and some basic instructions to begin using the app. The initial screen 210 can also include a device list area 216 that lists the identifying information for any previously connected devices (i.e., devices that have been previously connected using that particular phone or tablet). Tapping a previously connected device (e.g., IM_X, IM_Y, of IM_Z in FIG. 5A) will raise a "Connecting . . . " dialog as the manifold app 200 attempts to connect to that device. The user may also delete any or all devices from the list. An instruction area 218 lists a "Discover" button allows the user to search for any active devices within range and a "Logs" button that allows the user to access previously recorded device data.

A primary function of the manifold app 200 can be to discover an active device through Bluetooth. When the user presses the "Discover" button in the instruction area 218 on the main screen 210, the app will put up a "Discovering . . . " dialog for a few seconds, then display a list of any discovered devices. This is shown in FIG. 5B. The user can then tap one of the listed devices (e.g., IM_A, IM_B, of IM_C in FIG. 5B), which will raise a "Connecting . . . " dialog as the manifold app 200 attempts to connect to that device. The user can also tap "Discover" again to repeat the discovery process, in the event that the manifold app 200 failed to detect the desired device the first time.

Once the manifold app 200 has connected to a Device, the app will then retrieve data from the Device and display it on the data screen. An example of a data screen 220 is illustrated in FIG. 5C. The data screen 220 may include a smart platform status area 222 that is similar or identical to the status area 212 of the initial screen 210. An instruction area 224 lists a "List" button allows the user to go back to the device list area 216 of the initial screen 210. The data screen 220 has a data area 226 that lists the selected device and any ID information associated with that device. The data area 226 also lists data particular to the selected device, such as low side pressure, low side temperature, low side sub-cool, high side pressure, high side temperature, and high side superheat. Calculations, such as superheat and sub-cool calculations, can be performed on the smart platform 104 via the manifold app 200, or those calculations can be performed by the smart manifold 102 and transmitted to the smart platform. The manifold app 200 can show the data in real time or close to real time through continuous retrieval and update for as long as the data screen 220 is displayed. The user can pause updating by selecting a pop-up menu item, or disconnect from the device by pressing the "Disconnect" button on the data screen 220.

The manifold app 200 can record received data to the internal memory 204 of the smart platform 104. Files can be named according to Device ID and time of recording. The files can be retrieved from the smart platform 104 and transmitted via any means available to the smart platform, such as a wireless cellular communications, WiFi communications, Bluetooth communications, or satellite communications.

Operation of the Smart HVAC Manifold System

A primary function of the smart HVAC manifold system 100 is to allow standard service procedures and to perform the basic calculations required to properly charge (add or remove refrigerant), determine capacity, Energy Efficiency Ratio and proper operation as specified by the A/C system equipment manufacturer and heat pumps using standardized charging charts/calculations for fixed type metering devices and target subcooling for thermal expansion valve (TXV) systems.

To accomplish this task, the smart HVAC manifold system 100 includes a perfect charge module that looks at target output (BTUh), electrical current and refrigerant charge characteristics to determine optimum refrigerant charge. As refrigerant is added to an A/C system, the cooling output and the EER (BTUs removed/power (watts) consumed) will increase until the charge is as the optimum level. If refrigerant is added beyond the optimum level, the refrigerant will back up in the condenser causing a decrease in the EER and a decrease in cooling output in fixed orifice systems due to an increase in the suction pressure and a reduction in condenser space and increase in discharge pressure. In fixed orifice systems, target superheat will be monitored along with output to determine the optimal operation. This module will require the use of external wet bulb and dry bulb thermometers, one or more current clamps, and airflow inputs, either from the Smart manifold or through user input.

The smart HVAC manifold system 100 can also include a troubleshooting module including a mode or algorithm that allows users to input information about the type of system and its components and, based on this information, will apply standardized troubleshooting algorithm(s) to help diagnose typical HVAC problems. This mode also includes basic service advice on fault remedies and tips to properly identifying problems. Examples might include considerations when installing a new TXV: bulb mounting, orientation, manufacturer nomenclature, and applications. Typical problems that can be encountered when troubleshooting can include:

- Refrigerant Overcharge (Fixed/TXV).
- Refrigerant Undercharge (Fixed/TXV).
- Liquid line restriction/undersized/plugged dryer (Fixed/TXV).
- Low evaporator airflow (Fixed/TXV).
- Low load (Fixed/TXV).
- High load (Fixed/TXV).
- Dirty condenser (Fixed/TXV).
- Low outdoor air temperature (Fixed/TXV).
- Inefficient compressor (Fixed/TXV).
- Presence of Non-condensibles (Fixed/TXV).
- Insufficient suction line insulation.
- Loose TXV bulb (TXV Only).
- TXV has lost its charge (TXV Only).
- Plugged TXV.
- TXV bulb poorly insulated (TXV Only).
- Refrigerant Flooding (via suction line temperature sensors at evaporator outlet and condenser inlet).
- Refrigerant Flashing (via liquid line temperature sensors located at condenser outlet and evaporator inlet).
- TXV Hunting (improperly varying its control position):
  - Oversized valve.
  - Bulb too far from outlet.
  - Incorrect bulb charge.
  - System under charge.
  - Uneven loading.
  - Poor distribution of refrigerant.
- High operating superheat:
  - Low refrigerant charge.
  - Insufficient subcooling.
  - Improperly adjusted TXV.
  - Excessive pressure drop in internally equalized TXV.
  - Contamination of blocking valve.
  - Partial loss of TXV bulb charge.
- Low operating superheat:
  - Poor TXV bulb mounting.
  - Improperly adjusted TXV.
  - TXV Valve stuck open.
  - Oil logging in the evaporator.
  - Improperly adjusted TXV.

The smart HVAC manifold system 100 can also include a compressor diagnostics mode that reads motor current from the common, start and run windings via optional probes that attach to the smart manifold 102. These readings are used to diagnose typical compressor problems.

The smart HVAC manifold system 100 can perform a variety of calculations related to the operation and maintenance of the A/C unit 106. All standard calculations will include information about the standard calculations (e.g., how calculated) and their typical ranges. This information can be accessed via the smart platform 104 and can be transmitted via the network 250 using one of the various modes of transmission employed by the smart platform. The system will allow for US customary or metric (SI) units of measure. The following standard calculations can be performed:

- Saturation temp—low side.
- Saturation temp—high side.
- Superheat (Actual).
- Subcooling (Actual).

The following advanced calculations can be performed:

- Total capacity (BTUH, KW, Tons)*
- Sensible capacity (BTUH, KW, Tons)*
- Latent capacity (BTUH, KW, Tons)*
- Sensible latent split (unit less ratio)*
- De humidification (LBS/Hr or SI equivalent)*
- Bypass factor (%)*
- Energy Efficiency Raito (EER)*

*Note: These calculations require user input or advanced measurement of airflow, and voltage from line to ground, and optional probes for air conditions and current.

Additionally, capacity calculations can be derived by measurements of mass flow rate of the conditioned medium at the evaporator coil and changes in enthalpy of the conditioned medium (air). The total heat added or removed can be determined using (preferably) a non-density dependent method of airflow measurement, or a density dependent method that is corrected by the apparatus, and a dry bulb and humidity sensor for the refrigerated or heated medium.

When using any of the air formulas it is important to understand how to correct for changes in the air density if the air being measured is not standard air. The air constants apply to standard air at 70° F. and 14.7 Pisa, (29.92"hg.) If air being measured is outside of these parameters, it may require that the constant be recalculated. For most situations the standard air formulas can be used, but if precise measurements are desired, adjustments to the constants should be made. Remember, fans are doing work; they are moving in reality pounds of air. The amount of air they will move in CFM remains constant with a variable mass flow rate, so the cubic feet of air they will move over any given time period will remain the same. The difference is in the density of the air or the number or the pounds per cubic foot. This is important because coil selection software calculates required coil capacities based upon pounds per hour (lb/hr) of air passing through the coil, not CFM.

The constant 4.5 is used to convert CFM to lbs/hr:

4.5=(60 min/hr÷13.33) or (60 min×0.075 lbs/cu ft),
where:

13.33 is the specific volume of standard air (cu·ft/lb); and
0.075 is the density (lbs/cu·ft).

If the air being measured is not standard air, the air density will vary with the barometric pressure and the absolute temperature. To recalculate the air density, measure the temperature and obtain the barometric pressure use the following formula:

Air Density (lb/cf)=1.325×$B_p$/$T_{abs}$, where:

1.325 (Constant to keep consistent units);
$B_p$=Barometric Pressure; and
Tabs=Temperature (Absolute).

1.325×29.92/(70° F.+460° F.)=0.0748~0.075 lb/cu ft. Example:

This is how standard air density is calculated.

If you were measuring air coming out of a furnace, and the air was 154° F. the air density would change as follows:

1.325×29.92/(154° F.+460° F.)=0.0645

If heated air were used in this formula, the constant would be:

(60 min×0.0645 lbs/cu ft)=3.87 instead of 4.5 used for standard air.

The constant used in the sensible heat formula 1.08 is used to convert CFM to lbs/hr and factor in 0.24 the specific heat of standard air (BTU/lb/° F.), where:

1.08=(0.24×60)/13.33 or 0.24×4.5

4.5=60 min/hr÷13.33, or (60 min×0.075 lbs/cu ft)

0.24 BTU=specific heat of standard air (BTU/lb/° F.)

The constant 0.68 used in the latent heat formula is used to factor out the amount of heat contained in water vapor in BTU/LB, where:

0.68=(60/13.33)×(1060/7000) or 4.5×(1060/7000);
and where:

13.33 is the specific volume of standard air (cu·ft/lb).
1060=average latent heat of water vapor. (Btu/LB).
7000=grains per lb or water.
4.5=60 min/hr÷13.33 or (60 min×0.075 lbs/cu ft).

The smart HVAC manifold system 100 can acquire real time data and use that data to perform performance calculations. Since HVAC systems are dynamic and conditions (e.g., load, ambient, and equipment output) are constantly changing, real time data acquisition of multiple points of data is necessary to accurately quantify performance and evaluate operation. Technicians capturing data manually are restricted by the time required to gather and interpret the measurements, record data and perform calculations before the load changes. Often systems are tested at a load condition less than full load, so conditions change faster than data can be obtained through traditional means. The system 100 can also verify measured data using algorithms that rule out data gaming and suspect or impossible measurements. The smart HVAC manifold system 100 can also perform measurement conditioning using GPS data and weather conditions available from local weather data (either automatically or via user input, as required) to apply corrections for non-standard conditions that might affect sensor accuracy or calculated accuracy if non-standard conditions were not considered. All of this can be performed in real time.

The implementation of the smart device to the smart platform 104 in the smart HVAC manifold system 100 yields many features and advantages that owe to the special functionality that current smart phone/device technology employs. Referring to FIG. 2, the smart platform 104 can communicate with a web/cloud based network 250 wirelessly via cellular communication/network connection 252 (e.g., 3G, 4G LTE, etc.), wirelessly via WiFi communication/network connection 254 over or through a WiFi enabled network, such as a local area network (LAN) 256 that acts as a gateway 258 linking the smart platform 104 to the web/cloud based network 250. Additionally, the smart platform 104 is outfitted with hardware and software that enables the acquisition of GPS location data 260 via GPS satellites 262. Furthermore, the smart manifold 102 can also have a connection 264 for communicating with the network 250, e.g., via a Wi-Fi, wired Ethernet, cellular, satellite communications, or machine-to-machine ("M2M") communications.

When changes are made during the servicing of a refrigeration system, particularly when refrigerant is added or removed to obtain the correct charge, there is an impact on system performance capacity that affects the overall operation. Many system variables and indicators of correct operation are affected and take time to stabilize. A technician that is rushed to complete service or unaware of all of the variables that impact performance may not wait long enough or could wait too long for the system to reach study state conditions before evaluating the impact on the changes that have been made. If these changes are made to quickly there is a high probability of overcharging or undercharging the system leaving it with substandard operation or driving the technician to undo changes that were made. If the technician waits too long there are lost labor costs. Because of real time data acquisition, the smart HVAC manifold system 100 can assess system changes over time and indicate when a steady state condition has been achieved and the system performance then be quantified, thus saving valuable repair time and money.

One advantage of the smart HVAC manifold system 100 realized through the implementation of the smart platform 104 is that manufacturer data 272 can be accessed via the network 250 and the A/C unit 106 can be tagged and identified, operating ranges and other pertinent information can be stored, and calculations/tables can be adjusted so that the unit is tuned in accordance with manufacturer specifications. The manufacturer data 272 can also include equipment specific troubleshooting data that can be used to identify problems with a specific A/C unit 106 based on manufacturer recommendations.

Another advantage of the smart HVAC manifold system 100 realized through the implementation of the smart platform 104 is that the smart phone built-in camera functions of the smart platform 104 can be utilized to scan equipment label data 280, such as bar codes or QR codes, to obtain identifying data for the A/C unit 106. This data can be used to obtain more detailed manufacturer data 272 for the A/C unit 106 via the network 250. Additionally, the system can allow users to tie photos to the pinned job site via the GPS module. This can allow the user to include tagged photos in reports to illustrate identified problem conditions, such as plugged coils, bad or misaligned or incorrectly tensioned belts, electrical failures, etc. Photos can also be used for equipment ID and tied together to show locations of thermostats, outdoor air controls or other remote sensors that might be tied to a unit. All photos can be location tagged via GPS for easier location by subsequent service technicians. Photos can also be tagged with unit settings and a historical data regarding the unit.

The multi-platform capabilities of the smart HVAC system 100 allows for customized applications (or apps) that will allow manufacturers to collect information about the operation of the system and to see initial commissioning results for warranty purposes. Applications may be customized with a database of unit performance or go to a remote look-up table to gather performance about the equipment (e.g., the Air-conditioning, Heating and Refrigeration Institute or AHRI directory of certified product performance, see http://www.ahridirectory.org/ahridirectory/pages/home.aspx).

Using the data gathered by the system 100, graphic trending allows user to see operating characteristics of the A/C unit 10 operation and/or service over time. These operating characteristics can include:

Pressure testing system integrity with time (standing pressure tests).
Vacuum decay/evacuation levels with time.
TXV Valve hunting.
Intermittent problems.
Run cycle information.

Remote real time reporting/monitoring allows information to be reviewed by a lead technician, commissioning expert or appliance manufacturer, utility or other interested party for third party evaluation of performance and operating characteristics. Data can be used to verify proper operation for extended warranty, minimizing callbacks and documentation of initial startup. The user can customize the display to give the application a custom look and feel by displaying preferred data laid out in a manner suited to their liking. The user can manipulate the size, location and the screen order of objects. The user can also customize reports and add a company logo. Templates can be shared with other users.

Another advantage of the smart HVAC manifold system 100 realized through the implementation of the smart platform 104 is that person-to-person communications 274 can be established over the network 250 via the cellular network connection 252 or the WiFi network connection 254. Additionally or alternatively, the communications 274 can be established directly with the smart platform 104 establishing a direct cellular network connection 276. Communication can be established from within the manifold app 200 or can be established with the app running in the background. The communications 274 may include text messaging, voice over internet protocol VOIP, video conferencing (2-way), email, and cellular voice and data. The communications can be used for technical support, training, and for communicating with others employing the smart HVAC manifold system 100.

These advanced communications features may enable a pay per use or a subscription service that gives users access to a group of seasoned professionals to help trouble shoot equipment problems. The service is a forum based product that has residential, commercial, industrial, and possible dealer only (eg. Trane, Carrier, Lennox) boards for users to ask questions. The service can be a moderated user community forum that is a subscription service that allows users to help each other solve problems in the field. Answers to user's questions are peer rated on a scoring system (e.g., 1 to 5 stars) that rates the quality of the answer. These professionals will be able to view the users information in real-time via their smart platform. If there are multiple answers to the questions users can sort answers by the rating of the person that answered the question. This group of professionals answering the questions can be grown from the top rated HVAC members and retired HVAC professionals that meet pre-established requirements to provide quality phone support. Support can be done via Skype®, Apple FaceTime®, text (SMS) messaging, phone or other similar medium. The service provides advanced support to technicians to provide solutions to problems that are not easily identifiable due to technician experience level or problem complexity. Service could be made available around the clock.

Serving as the go-between for the local smart manifold 102, the web/cloud-based network 250, and the GPS location data 260 allows the smart platform 104 to facilitate combining the data to provide several advantageous features. Since the smart platform 104 communicates locally with the smart manifold 102 via Bluetooth, the GPS location data 260 can be used to associate the manifold with a geographic location. The system can thus utilize geo-tagging/time tagging for identification and recordation purposes. Additionally, since all of these functions converge at the manifold app 200 on the smart platform 104, any data acquired by the app or entered into the app can be time-stamped and recorded in real time, and can be used, e.g., for purposes of reporting, auditing, and long term trending.

The smart platform based GPS allows the technician to pinpoint the location of where the system is serviced via an online mapping service (e.g., Google maps). The GPS will show the approximate location of the technician relative to the equipment (e.g., within about 5-10 meters accuracy with full view to the sky) and allow the technician to drop a pin at the exact location if needed. The address will be automatically imported from the GPS location. When the pin is selected on the map, information about the unit including model and serial numbers, last date of service, servicing technician, unit service history, past performance will be available (i.e., if the HVAC smart manifold system 100 was utilized in commissioning or previous service of the unit). Also available will be a photo of the model and serial number tag to verify unit is the exact unit identified by the location marker.

Over time, a map of A/C unit 106 installations identified by the smart HVAC manifold system 100 can be developed and used for multiple purposes, such as producing a savings calculator for equipment replacement purposes, or producing a calculator for equipment repair that estimates payback periods. Such a map could also be used to anticipate electric utility demand by geographic location.

Knowing the GPS location data 260, the manifold app 200 can access location data, such as weather and climate data, and time-stamp and associate that data with operations (e.g., tune-ups) performed on the A/C unit 106 at a site specific location. Additionally, the weather and altitude data can be used to make adjustments to calculations, for example, to air density based on the barometric pressure and altitude at the geographic location.

Example configurations of the smart HVAC manifold system 100 are illustrated and described in FIGS. 8-16.

From the above description of the invention, those skilled in the art will perceive improvements, changes and modifications. Such improvements, changes and modifications within the skill of the art are intended to be covered by the appended claims.

We claim:

1. A system for monitoring the operation of an HVAC unit, the system comprising:
wireless sensors that connect to the HVAC unit and measure operating conditions of the HVAC unit;
an electronics unit comprising a first wireless communication module that communicates with the wireless sensors to obtain measured data corresponding to the measured operating conditions of the HVAC unit; and
a smart platform that communicates wirelessly with a second wireless communication module of the electronics unit to obtain the measured data, wherein the smart platform further comprises a processor that executes an application that performs calculations using the measured data to determine the condition of the HVAC unit, wherein the operating conditions of the HVAC unit comprise at least one of refrigerant line temperatures of the HVAC unit, refrigerant line operating pressures of the HVAC unit, ambient temperatures, and ambient atmospheric pressures, relative humidity, airflow, refrigerant weights, and electrical operating conditions of the HVAC unit.

2. The system recited in claim 1, wherein the smart platform comprises a graphical display and the processor executes the application to transform the measured data to user information in a tangible form that is displayed on the smart platform, the user information comprising the measured operating conditions, data that is at least one of calculated and looked-up by the smart platform, and indications of required tune-up parameters for the HVAC unit.

3. A system for monitoring the operation of an HVAC unit, the system comprising:
wireless sensors that connect to the HVAC unit and measure operating conditions of the HVAC unit;
an electronics unit comprising a first wireless communication module that communicates with the wireless sensors to obtain measured data corresponding to the measured operating conditions of the HVAC unit; and
a smart platform that communicates wirelessly with a second wireless communication module of the electronics unit to obtain the measured data, wherein the smart platform further comprises a processor that executes an application that performs calculations using the measured data to determine the condition of the HVAC unit, wherein the operating conditions comprise a high-side refrigerant line pressure of the HVAC unit, a low-side refrigerant line pressure of the HVAC unit, a high-side refrigerant line temperature of the HVAC unit, and a low-side refrigerant line temperature of the HVAC unit.

4. The system recited in claim 2, wherein the smart platform further comprises a GPS module that obtains geographic location data for the smart platform, wherein the processor executes the application to tie the geographic location of the smart platform to the location of the HVAC system.

5. The system recited in claim 4, wherein the smart platform further comprises wireless cellular communication capabilities that provide the smart platform with internet connectivity.

6. The system recited in claim 5, wherein the processor executes the application to obtain via the internet additional data and pairing that additional data to the geographic location data of the HVAC system, the additional data comprising location-based climate data, location-based weather data, and the altitude at which the HVAC system is installed.

7. The system recited in claim 2, wherein the data that is at least one of calculated and looked-up by the smart platform comprises system refrigerant superheat data, system refrigerant subcooling data, wet-bulb temperature data, dry-bulb temperature data, and tune-up parameters for the HVAC unit.

8. The system recited in claim 1, wherein the smart platform comprises a smart phone.

9. The system recited in claim 1, wherein the first communication module comprises a ZigBee radio.

10. The system recited in claim 1, wherein the second communication module comprises a Bluetooth radio.

11. The system recited in claim 1, wherein the electronics unit further comprises ports for connecting with wired sensors for sensing additional operating conditions related to the HVAC unit, comprising at least one of temperature sensors, pressure sensors, vacuum sensors, electrical voltage sensors, electrical current sensors, humidity sensors, refrigerant flow rate sensors, air quality sensors, and air flow rate sensors.

12. A system for monitoring the operation of an HVAC unit, the system comprising:
wireless sensors that connect to the HVAC unit and measure operating conditions of the HVAC unit;
an electronics unit comprising a first wireless communication module that communicates with the wireless sensors to obtain measured data corresponding to the measured operating conditions of the HVAC unit; and
a smart platform that communicates wirelessly with a second wireless communication module of the electronics unit to obtain the measured data, wherein the smart platform further comprises a processor that executes an application that performs calculations using the measured data to determine the condition of the HVAC unit,
wherein the smart platform further comprises wireless cellular communication capabilities that provide the smart platform with internet connectivity, wherein the smart platform further comprises a built-in camera, and wherein the processor executes the application to utilize the camera to scan label data of the HVAC unit, retrieve identification data for the HVAC unit from the scanned label data, and look-up via the internet manufacturer data related to the HVAC unit based on the identification data.

13. The system recited in claim 12, wherein the processor executes the application to utilize the camera to scan label data of the HVAC unit, retrieve identification data for the HVAC unit from the scanned label data, and look-up via the internet manufacturer data related to the HVAC unit based on the identification data.

14. The system recited in claim 13, wherein the processor executes the application to utilize the manufacturer data related to the HVAC unit to modify the calculations using the measured data to determine the condition of the HVAC unit.

15. The system recited in claim 2, wherein the electronics unit comprises:
a housing;:
memory mounted in the housing, the memory comprising non-volatile memory for storing firmware;
the first and second wireless communication modules being mounted in the housing;
a microcontroller mounted in the housing, the microcontroller comprising a processing unit operative to execute instructions from the firmware to obtain and condition the signals from the wireless sensors via the first wireless communication module and determine from the signals measured data corresponding to the operating conditions of the HVAC unit;

wherein the microcontroller transfers the measured data to the second wireless communication module, which transmits the measured data to the cell phone or tablet computer.

16. The system recited in claim 15, further comprising sensor inputs for receiving signals from additional wired and wireless sensors, the microcontroller being further operative to execute instructions from the firmware to obtain and condition signals from the additional sensors as a portion the measured data.

* * * * *